United States Patent [19]
Swank

[11] Patent Number: 6,026,720
[45] Date of Patent: Feb. 22, 2000

[54] CUE SERVICING AND REPAIR APPARATUS

[76] Inventor: Bryan W. Swank, 4491 E. Wembley La., Columbus, Ind. 47201

[21] Appl. No.: 08/885,715

[22] Filed: Jun. 30, 1997

[51] Int. Cl.[7] .................................................. B23B 19/02
[52] U.S. Cl. .............................. 82/128; 82/132; 82/142; 82/148
[58] Field of Search ............................ 82/128, 132, 134, 82/113, 115, 121, 142, 148, 149, 159, 161, 901; 407/24, 23; 279/2.02, 2.04, 2.11, 2.22, 46.1, 46.5, 53, 62

[56] References Cited

U.S. PATENT DOCUMENTS

| | | |
|---|---|---|
| D. 357,262 | 4/1995 | Porper . |
| D. 367,066 | 2/1996 | Chen . |
| 2,127,745 | 8/1938 | Lochman .................................. 82/142 |
| 2,546,351 | 3/1951 | Stoner ...................................... 279/53 |
| 2,746,758 | 5/1956 | Stoner et al. ............................. 279/53 |
| 3,128,533 | 4/1964 | Haugland .............................. 82/128 X |
| 3,316,946 | 5/1967 | Ryan et al. . |
| 3,483,775 | 12/1969 | Van Someren et al. . |
| 3,903,765 | 9/1975 | Morse . |
| 4,028,972 | 6/1977 | Morse ..................................... 82/142 |
| 4,037,496 | 7/1977 | Gerth ...................................... 82/142 |
| 4,061,165 | 12/1977 | Harwood et al. . |
| 4,471,824 | 9/1984 | Zownir . |
| 4,538,488 | 9/1985 | Arvaï . |
| 4,594,782 | 6/1986 | Willard . |
| 4,620,370 | 11/1986 | Zownir et al. . |
| 4,658,681 | 4/1987 | Pollak et al. .......................... 82/149 X |
| 4,785,586 | 11/1988 | Kratfel . |
| 4,823,655 | 4/1989 | VanderPol . |
| 4,987,936 | 1/1991 | Calabrese . |
| 5,072,636 | 12/1991 | Gueli et al. . |
| 5,186,087 | 2/1993 | McCormack . |
| 5,186,088 | 2/1993 | Wixey . |
| 5,208,985 | 5/1993 | Carter . |
| 5,228,160 | 7/1993 | Porper . |
| 5,694,669 | 12/1997 | Porper . |

OTHER PUBLICATIONS

"The Q–Lathe" By Creative Inventions, Catalog 1996.
"The Q–Lathe Mate" By Creative Inventions, brochure.
Joe Porper's "Adjustable Collets", Creative Inventions (1–page informational sheet).

*Primary Examiner*—Andrea L. Pitts
*Assistant Examiner*—Henry W. H. Tsai
*Attorney, Agent, or Firm*—Locke Reynolds LLP

[57] ABSTRACT

An apparatus for servicing and repairing cues including a collet mounted to a rotation member and having a collet body defining a passage including a generally conical surface, at least two collet jaws formed of a flexible resilient material and slidably disposed within the passage to define arcuate gaps with the surface, and an adjuster for slidably moving the collet jaws to flexibly bear against a cue inserted through the collet. A cutter feed includes a mounting to a bed proximate to a headstock for movement parallel to the bed. A cue tip shaper mounted to the cutter feed and having a rotatable arm for shaping a cue tip to a preselected curvature. A flexible resilient sleeve rotationally mounted to a support for holding a cue by frictional contact. A pivot mount for mounting a motor to the bed in a first position proximate to the support and pivotable to a second position proximate to the headstock. A pincers press mounted for sliding movement along a guide way to pinch and smooth wrap on a cue. An iron mounted for sliding movement along the guide way to apply heat and pressure to wrap on a cue. A cue tip holder for mounting to the cutter feed and having at least one resilient finger adapted to hold a cue tip for attachment to the cue.

31 Claims, 30 Drawing Sheets

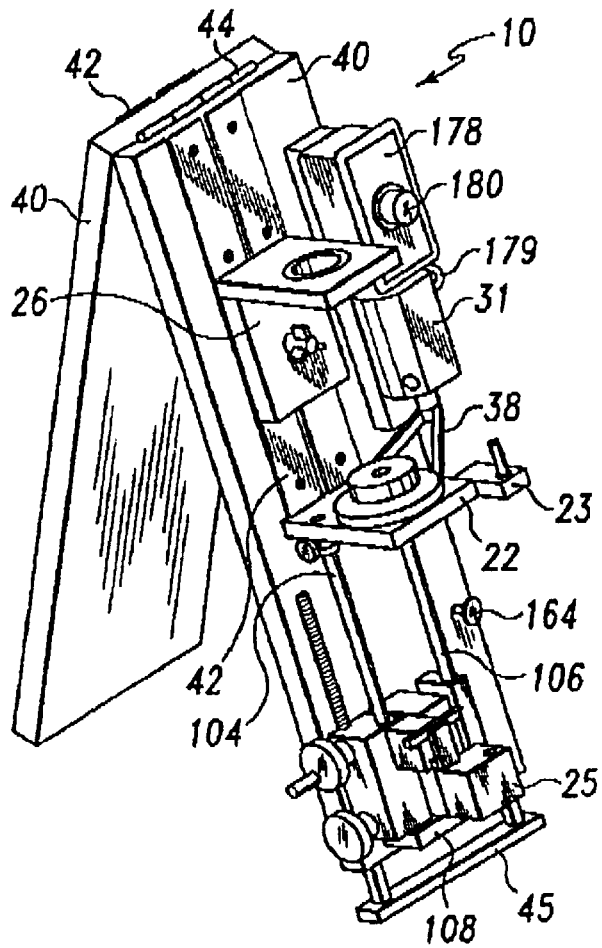
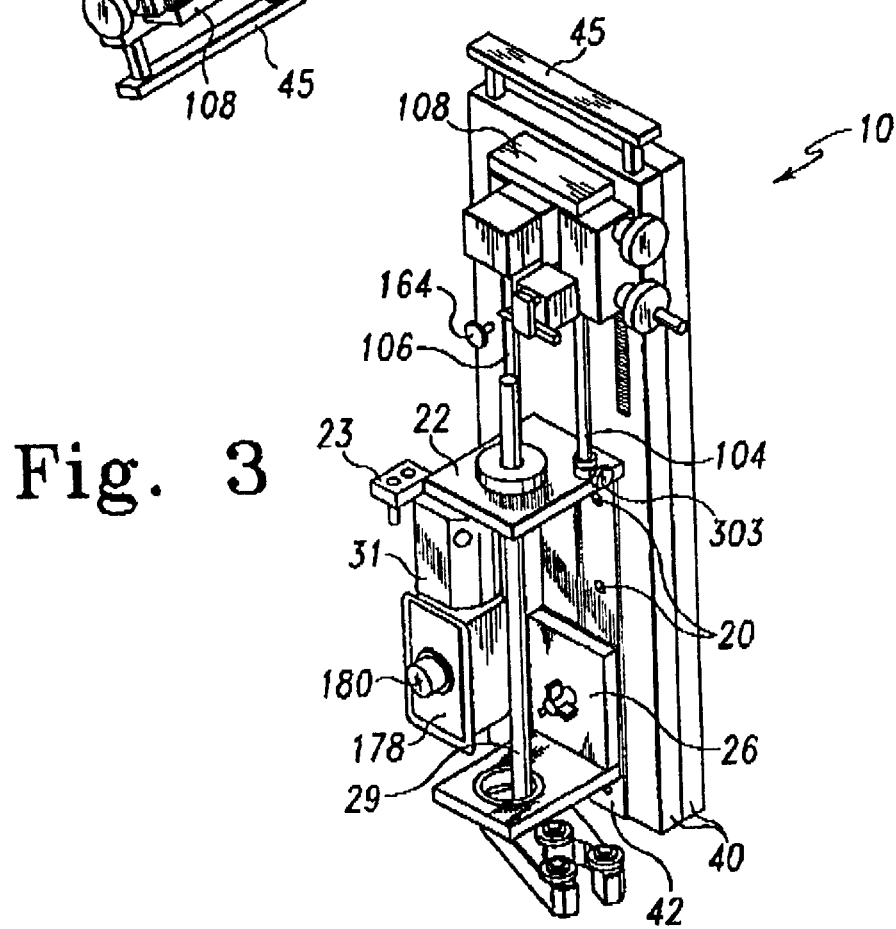
Fig. 2
Fig. 3

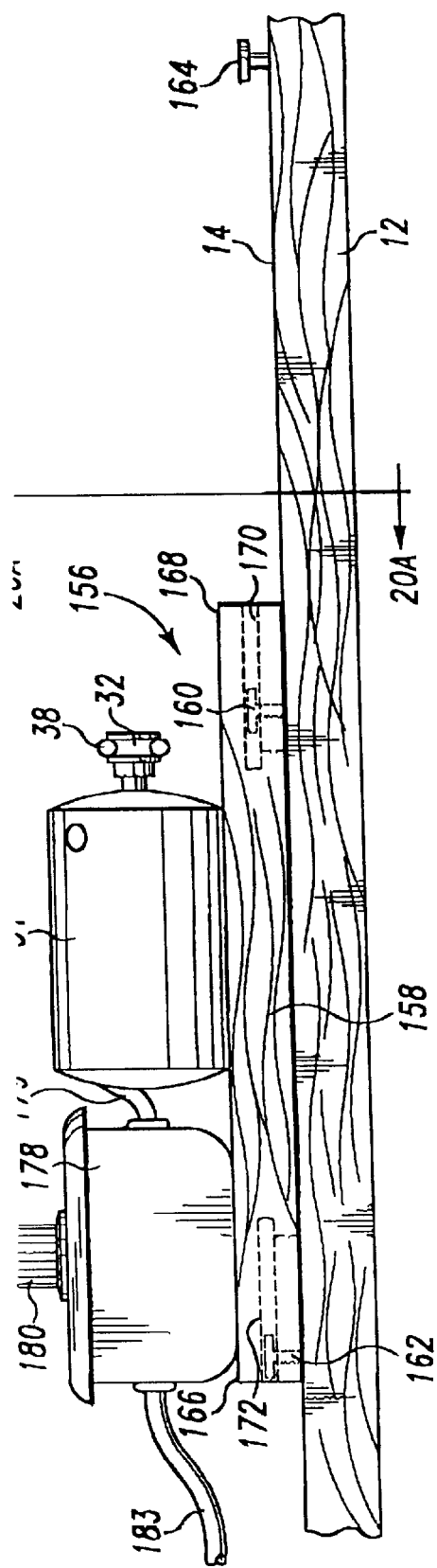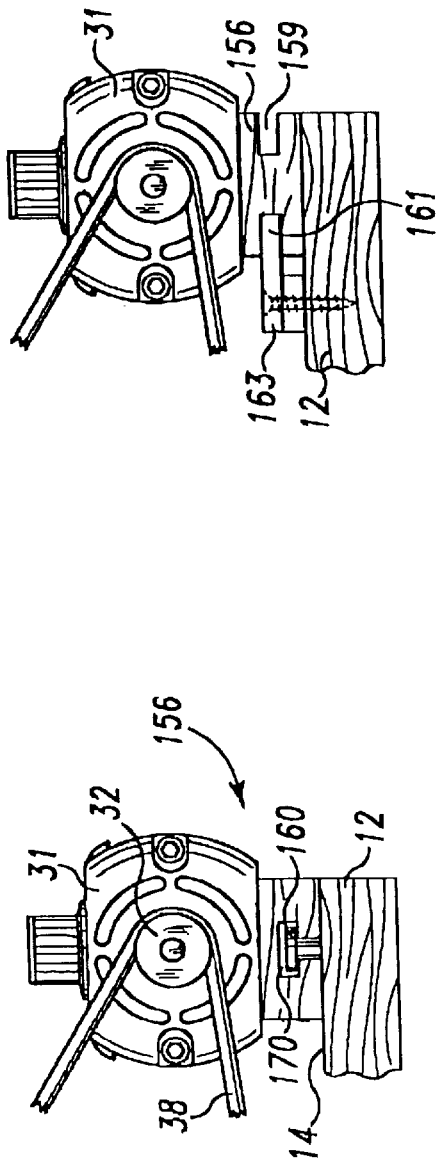

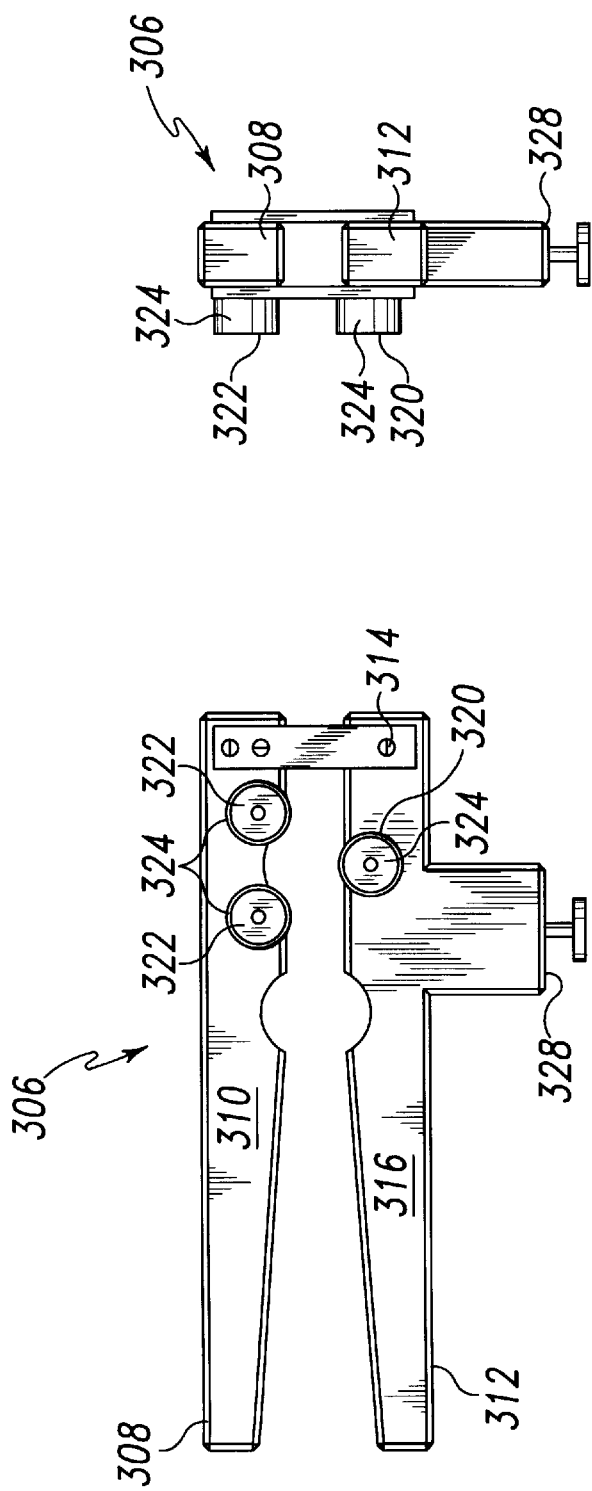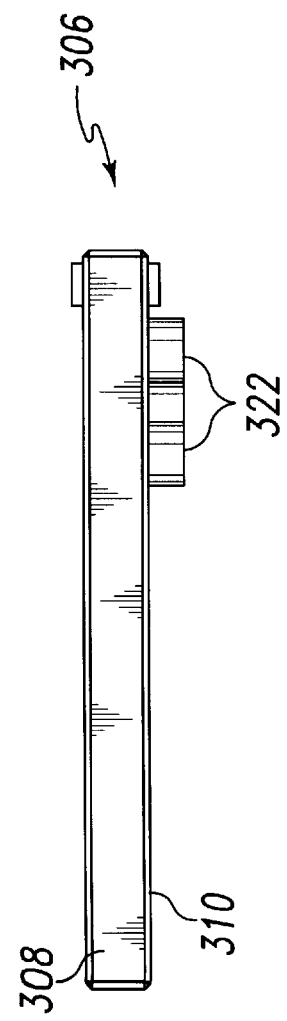
Fig. 33
Fig. 32
Fig. 34

CUE SERVICING AND REPAIR APPARATUS

BACKGROUND OF THE INVENTION

1. Field of the Invention

The present invention generally relates to the field of apparatus for servicing and repairing cues used in activities such as pool, billiards, and the like, and more particularly concerns apparatus for replacing cue tips, tenons, ferrules, joint rings, and butt caps, and for refinishing and cleaning cues, and replacing cue wraps.

2. Description of the Prior Art

There is presently available a number of devices for servicing and repairing cues where a cue is mounted to a rotation member attached to a stationary bed and driven by a motor, with various operations performed upon the cue as the cue rotates about its axis. Such devices which are capable of performing all of the required tasks of servicing and repairing cues are generally large, heavy, and not easily transported. In addition, cues are frequently mounted to currently available devices using a chuck which may damage a cue, and more than one motor may be provided to perform operations requiring the cue to rotate at widely different speeds and torques. Moreover, tooling of such devices may be difficult to precisely adjust to a desired position with respect to the cue, and shaping of cue tips may be limited to a minimal number of profiles.

Despite the availability of such devices, there exists a need in the art for an apparatus for servicing and repairing cues that is capable of securely mounting a cue for rotation without damaging the cue, has tooling which is easily and precisely adjustable to a variety of positions, including tooling for shaping cue tips to have any of a wide range of profiles, yet is lightweight, easily handled and transported, and uses a single motor to drive rotation of a mounted cue at any of a easily controlled wide range of speeds and torques.

SUMMARY OF THE INVENTION

In order to aid in the understanding of the present invention, it can be stated in essentially summary form that it is directed to an apparatus for servicing and repairing cues including collets of different size which can be easily substituted for one another are mounted for rotation by a rotation member of a common size. Each collet has a collet body defining a passage including a generally conical surface, and at least two collet jaws formed, positioned and oriented to radially flex when placed in contact with a work piece. The collet jaws can be formed of a resilient material slidably disposed within the passage to define arcuate gaps with the generally conical surface. An adjuster is provided for slidably moving the collet jaws to flexibly bear against a cue inserted through the collet.

A cutter feed is provided along with means for mounting the cutter feed to a bed proximate to a headstock for movement parallel to the bed. The present invention also includes a cue tip shaper with a single sided bearing mounted to the cutter feed and having a rotatable arm for shaping a cue tip to a variety of curvatures, a flexible resilient sleeve rotationally mounted to a support for holding a cue by frictional contact, a pivot mount for mounting a motor to the bed in a first position proximate to the support for rotation of the work piece in a first direction and pivotable to a second position proximate to the headstock for rotation of the work piece in a second direction. A pincers press with a set of cantilevered rollers can be mounted for sliding movement along a guide way to pinch and smooth wrap on a cue, an iron including a thermally insulated guide know can be mounted for sliding movement along the guide way to apply heat and pressure to wrap on a cue, and a cue tip holder and centering device can be mounted to the cutter feed and having at least one resilient finger adapted to hold and center a cue tip for attachment to the cue.

More specifically, the apparatus for servicing cues of the present invention includes a bed defining a generally horizontal planar surface. Attached to the bed is a longitudinal guide way defining a generally straight longitudinal slot, using a plurality of fasteners. A headstock is mounted to the bed and includes a projecting arm and a rotation member. A cutter feed is mounted to the bed through two longitudinal rails proximate to the headstock, for movement parallel to the planar surface. A generally L-shaped support is slidably mounted to the guide way at the slot and is alignable with the headstock. Sliding movement of the support along the guide way is facilitated by at least one support finger projecting from the support for placement proximate to the guide way and capable of sliding engagement within the slot. A damper can be removably mounted to the bed, disposed to project from the bed away from the headstock and generally parallel to the slot. A coupler is provided for the coupling a motor to the rotation member, and includes a motor pulley attached to the motor, a collet pulley mounted to the rotation member, and a belt mounted between the motor pulley and the collet pulley.

The bed can be formed to include a pair of bed segments, and the guide way can correspondingly be formed to include a pair of guide way segments, with each guide way segment attached to a bed segment. A hinge can be disposed between and hingeably attaching together the bed segments, whereby the present invention can be folded subsequent to removal of projecting elements such as the damper. After folding or merely separating the pair of bed segments, the present invention can be easily transported using a handle mounted to an end of one of the bed segments.

The present invention can be utilized to service or repair a one-piece cue by removably mounting the one-piece cue generally parallel to the guide way and through the headstock, the support, and the damper. In addition, the present invention can also be used to service or repair a two-piece cue by removably mounting a portion of a two-piece cue generally parallel to the guide way and through the headstock and the support.

The rotation member includes a collet bearing mounted to the headstock within a headstock aperture, and also includes a collet. The collet includes a collet body having a collet body flange, a collet body neck adapted to fit within the collet bearing and including interior threads, an annular step, a circumferential snap ring slot, and pry holes. The collet body is mounted to the collet bearing with a snap ring disposed in the snap ring slot so that the collet bearing is sandwiched between the annular step and the snap ring. The collet pulley is mounted to the collet body with the collet body neck disposed through the collet pulley aperture. The collet further includes a collet adjuster having an adjuster flange defining adjuster pry holes, an adjuster neck including adjuster exterior threads adapted for engagement with the interior threads of the collet body and a projecting annular collar portion. The collet adjuster also defines an adjuster aperture. The collet body defines a passage therethrough including an exterior cylindrical surface, a generally conical surface, and an interior cylindrical surface. The generally conical surface includes a larger diameter end and a smaller diameter end. A plurality of collet jaws are provided which are preferably formed of a conformable, resilient material. The collet jaws are slidably disposed within the passage proximate to conical surface. Each collet jaw is formed to have a generally cylindrical collet jaw inner surface and a generally conical collet jaw outer surface which corresponds to at least a portion of the conical surface proximate to the larger diameter end. Each collet jaw can slide towards the smaller diameter end, defining an arcuate gap between each collet jaw outer surface and a portion of the conical surface of the collet body. Biasing elements are coupled to the collet jaws to urge the collet jaws generally radially outwardly against the passage and away from the other collet jaws, towards enlarging the size of the lateral gaps between adjacent collet jaws. The collet adjuster is adapted for slidably moving the collet jaws towards the smaller diameter end as the collet adjuster is threadably tightened into the collet body. The rate of closure of the collet jaws relative to their axial displacement accelerates as they progress to the smaller diameter end of the conical surface. This effect is a result of the unique engagement of the jaws at their outer edges rather than at the center of their arc.

As the collet adjuster is threadably tightened, central portions of the collet jaw inner surfaces are capable of bearing against a portion of cue inserted through the passage and the collet jaws, so that the arcuate gaps are reduced in size by flexure of the collet jaws towards the conical surface. This flexure lowers and distributes the load applied by the jaws on the cue thereby minimizing the possibility of damage to the cue. The motor can produce rotation of the collet and the cue through coupling of the motor pulley to the belt and the collet pulley.

The cutter feed is mounted to the bed using first and second longitudinal rails attached between the headstock and a rail support mounted to the bed, so that the cutter feed is disposed for movement generally parallel to the planar surface and the guide way. A first axial block defines a first aperture that generally corresponds with the first longitudinal rail but is slightly larger than the first longitudinal rail, whereby the first axial block is capable of sliding movement along the first longitudinal rail, with the first longitudinal rail disposed within the aperture. Similarly, the second axial block, having an axial block surface defining a second aperture that generally corresponds with the second longitudinal rail, is mounted for sliding movement surrounding and along the second longitudinal rail. The second aperture is substantially larger than the second longitudinal rail and a first adjustment member is mounted for holding the second longitudinal rail against a portion of the axial block aperture surface at a preselected and adjustable pressure to eliminate axial rotation around the first rail as well as providing the required amount of sliding resistance. This method of adjustment minimizes the need for accurate placement of the first rail relative to the second rail.

A first transverse rail and a second transverse rail are disposed generally parallel to the planar surface and perpendicular to the guide way, and are mounted between and attach the first axial block to the second axial block. In a manner similar to the first and second apertures, a transverse block defines therethrough a first opening that corresponds with but is slightly larger than the first transverse rail, and further defines a second opening that corresponds with but is substantially larger than the second transverse rail. The transverse block is mounted for sliding movement along the first and second transverse rails, with the first transverse rail disposed within the first opening and the second transverse rail disposed within the second opening. A second adjustment member is threadably mounted within the transverse block for holding the second transverse rail within the second opening at a predetermined but adjustable pressure. Again, this method of adjustment minimizes the need for accurate placement of the first rail relative to the second rail. A tailstock, defining a tailstock bore, is mounted to the transverse block and is capable of movement with the transverse block parallel to the planar surface as an integral part of the cutter feed.

Alternatively, the first axial block can define the first aperture including a generally rounded upper portion and an open lower portion, with the upper portion generally corresponding with and substantially larger than the first longitudinal rail. The first axial block can further define a pair of spaced-apart bearing channels, with each bearing channel disposed generally parallel to and communicating with the upper portion. A bearing rod can be mounted in each bearing channel so that a portion of each bearing rod projects within the first aperture, forming a contact surface. With the bearing rods so disposed, the first axial block can be placed over and partially surrounding the first longitudinal rail, with the contact surfaces contacting the first longitudinal rail, so that the first axial block is capable of sliding movement with respect to the first longitudinal rail. The first axial block can further define a tapped retaining fastener opening disposed generally normal to the first aperture and below the bearing channels. A retaining fastener, having a generally tapered tip, can be threadably disposed in the retaining fastener opening. The first longitudinal rail can thus be held in three-point contact between the bearing rods and the retaining fastener, with the tapered tip disposed in contact with the lower portion of the first longitudinal rail with force necessary so that the first longitudinal rail bears against the bearing rods at a selected yet adjustable pressure for sliding movement of the first axial block with respect to the first longitudinal rail.

More or less than a pair of bearing rods can be utilized in the present invention. For instance, the first axial block can be formed with the first aperture substantially larger than and disposed to completely surround the first longitudinal rail with the first axial block defining three spaced apart bearing channels. With a bearing rod mounted in each of the bearing channels, the first axial block can be mounted for sliding movement along the first longitudinal rail surrounding the first longitudinal rail and in sliding contact with the contact surfaces of the bearing rods projecting into the first aperture.

The second axial block may, in addition, be mounted to the second longitudinal rail in a manner entirely similar to that of the first axial block and the first longitudinal rail, and the transverse block can be mounted to either or both of the first and second transverse rails in an entirely similar manner. A set screw with a ball bearing at the end of the lead screw which provides the transverse motion can be employed to finely adjust the play in the transverse direction.

The cutter feed can be adjustably moved parallel to the guide way to a desired position relative to the collet by rotation of an longitudinal feed knob coupled to an longitudinal feed shaft having a gear engaged with a gear rack. The longitudinal feed shaft is disposed between the first and second axial blocks and is slidably disposed through the transverse block. Similarly, the transverse block can be adjustably moved perpendicular to the guide way to a desired position, sliding along the longitudinal feed shaft and the first and second transverse rails by a rotation of transverse feed knob coupled to a threaded transverse feed shaft disposed between the first and second axial blocks, and threadably engaged with a tapped hole defined in the transverse block. In this way, the cutter feed can be positioned at a desired location with respect to a cue mounted to the present invention, in order to perform repair and servicing operations.

The present invention further includes a pivot mount for mounting the motor to the bed. The pivot mount includes a motor support base attached to the motor, a pivot pin attached to the bed, a first retainer pin attached to the bed proximate to the support, and a second retainer pin attached to the bed proximate to the tailstock. At opposing ends of the motor support base are defined a pivot pin aperture and a retainer pin aperture. The cross-sectional shape of the pivot pin aperture is selected to correspond to the shape of the pivot pin so that the motor support base is capable of sliding movement with respect to the pivot pin while the pivot pin is captured within the pivot pin aperture. Similarly, by selecting the first and second retainer pins to have substantially similar dimensions, and selecting the cross-section of the retainer pin aperture to correspond to the shape of the first and second retainer pins, the motor support base is capable of sliding movement with respect to the first retainer pin when the first retainer pin is captured within the retainer pin aperture, and the motor support base is capable of sliding movement with respect to the second retainer pin when the second retainer pin is captured within the retainer pin aperture. In this way, the motor can be detachably mounted to the pivot pin and the first retainer pin in a first position proximate to the support. Alternatively, the motor can be detachably mounted to the pivot pin and the second retainer pin in a second position proximate to the tailstock. With the motor disposed in the first position, the rotation member is driven to rotate in a first direction by the motor, and a region of the bed proximate to the cutter feed is uncluttered by the motor, permitting operations utilizing the cutter feed to be easily performed. With the motor disposed in the second position, the rotation member is driven to rotate in an opposite direction by the motor, and a region of the bed between the headstock and the support is uncluttered by the motor, permitting operations performed between the headstock and the support to be easily accomplished. The pivot pin aperture is adapted for pivoting coupling of the motor support base to the pivot pin and the retainer pin aperture is adapted for coupling to the first retainer pin when the motor is disposed in the first position, and to the second retainer pin when the motor is disposed in the second position. Alternatively, a motor mount is provided which includes a pair of oppositely disposed grooves, the motor mount being positionable in two alternative positions where one of the grooves slidably engages a guide rail which allows for infinite adjustment of motor location.

A controller is provided for controlling the rotational speed of the motor and therefore the rotational speed of a cue mounted to the present invention. The controller includes a first speed control mounted to the motor support base and electrically connected to the motor. The first speed control is adapted to operate by a hand using an adjustment knob, and is electrically connected to a junction unit. Electrical power is supplied to the junction unit and a second speed control adapted to be operated by a foot is electrically connected to the junction unit, so that the second speed control wire is in series with the first speed control. By adjusting the first speed control to limit maximum rotational speed to a preselected level appropriate to a particular task being performed, the second speed control can be used to vary rotational speed up to the preselected level. By utilizing a stop to hold the second speed control in a position that provides minimum electrical resistance, the rotational speed of the motor can be controlled entirely by the first speed control.

A sleeve, defining a sleeve aperture, is removably mounted to the support within an inner bearing race for rotation with the race about an axis generally parallel to the slot. The support is slidably mounted to the guide way using a support fastener, and a low friction support pad can be mounted to the support for sliding contact with the guide way. A cue disposed through and held by the collet can also be disposed through the sleeve. By forming the sleeve of a flexible, resilient material, a cue can be rotationally mounted to the support by frictional contact through the sleeve, without the sleeve causing damage to the cue. With the motor rotationally driving the collet, the cue can rotate within the support and the headstock.

In the event that the present invention is used to repair or service a two-piece cue, a flexible, resilient gripper, adapted for mounting to the sleeve is provided, so that an end of a segment of a two-piece cue, such as the cue tip, can be engaged with the gripper and mounted to the present invention without damaging the cue segment. The gripper can be in the form of a butt segment gripper having a cylindrical portion, a conical portion, and a centering projection, adapted to engage the larger end of the butt segment of a two-piece cue. The cylindrical portion is adapted to fit tightly within the sleeve aperture, in order to mount the butt segment gripper to the sleeve. The conical portion is adapted to project into an indentation defined in the larger end of the butt segment, with the centering projection acting to help align the axis defined by the butt segment with the rotational axis of the sleeve bearing. The butt segment can thus be rotationally mounted to the present invention, disposed through the collet and in contact with the butt segment gripper. The gripper can be in the form of a shaft segment gripper having a neck portion and an indented portion, adapted to engage the greater end of the shaft segment of a two-piece cue. With the neck portion fitting tightly within the sleeve aperture, the indented portion is adapted to receive a threaded portion of the greater end of the shaft segment and align an axis defined by the shaft segment with the rotational axis of the sleeve bearing. The shaft segment of a two-piece cue can thus be mounted to the present invention, disposed through the collet and in contact with the shaft segment gripper.

In the event that the present invention is utilized to service or repair a one-piece cue, mounting of such a cue to the present invention with cue disposed through the collet and the sleeve aperture may necessitate extension of the butt end beyond the bed. As one-piece cues are frequently warped, rotation of a cue held in place by the collet and the sleeve aperture may produce significant circular movement of the butt end. In order to damp such movement of the butt end, the damper can be utilized. The damper includes the damper shaft slidably disposed through an arm attached to the bed. A damper end mounted to the damper shaft includes three rollers coupled to two damper sections which are separable relative to each other and biased toward each other to define a variable opening adaptable to the diameter of the butt end of the cue. Using the damper, as a cue rotates within the variable opening, motion of the butt end is damped while the finish of cue is protected from damage by the three rollers.

A cue tip shaper is provided and includes a shaper base defining a shaper attachment slot and a shaper arm rotatably mounted to the shaper base at a shaper pivot. A shaper blade, defining a tip cutting surface, is adjustably mounted to the shaper arm using blade fasteners. The cue tip shaper is removably mountable to the tailstock by a tailstock fastener disposed through the shaper attachment slot, so that the shaper arm is rotatable at the shaper pivot about an axis that is generally normal to the planar surface and to the first and second longitudinal rails. With the motor driving the rotation member thereby causing a cue mounted through the collet to rotate, a cue tip attached to the cue can be shaped to a preselected curvature, by positioning the tailstock and the cue tip shaper using the longitudinal feed knob and the transverse feed knob, and the rotating shaper arm about the shaper pivot so that the cue tip shaper is proximate to the rotating cue and the tip cutting surface contacts and shapes the rotating cue tip to a preset yet adjustable radius.

The present invention also provides a cue cutter, having a cue cutting element removably mountable to the first axial block using a cutter attachment plate and an attachment plate fastener. With the motor driving the rotation member, causing a cue mounted through the collet to rotate, a cue end and a ferrule, from which a cue tip has been removed, can be cut and trimmed to make a flat surface prior to attaching a replacement cue tip, by positioning a first axial block and the cue cutter parallel to the planar surface using the longitudinal feed knob so that the cue cutter is proximate to the rotating cue end and the ferrule, with the cue cutting element contacting, cutting and trimming material at the cue end and the ferrule of the rotating cue. Additionally, this cutting process can be used to replace ferrules, joint rings, and butt caps.

A drill member is adapted to be mounted to the tailstock which is uniquely attached to the cutter feed block. The drill member is inserted into the tailstock bore and securing with a tailstock fastener. Using the longitudinal feed knob and the transverse feed knob to coaxially align the drill member with a cue mounted to the present invention, movement of the drill member towards the rotating cue using the cutter feed enables a coaxial hole to be drilled into the cue, thereby permitting insertion of a dowel or similar as part of replacement of a damaged portion of the cue. A replacement dowel can be threaded using a compression die which can be kept in alignment by the tailstock.

Movement of the cutter feed and the tailstock towards a cue can be facilitated by use of a lever defining a lever pin hole and having a contact portion and a lever handle. The lever is pivotally mounted to a lever bracket within a lever slot by attachment with a lever pin disposed in a lever pin aperture. The lever bracket further defines a generally U-shaped rail slot and a tapped lever bracket bore, whereby the lever bracket can be disposed with the second longitudinal rail cradled within the rail slot and a threaded lever bracket fastener disposed within the lever bracket bore and bearing against the second longitudinal rail. The lever bracket and the lever can be removably mounted to the second longitudinal rail at a desired position so that the contact portion is capable of bearing against a portion of the cutter feed, the tailstock, or, an arbor of the drill member. Pivoting movement of the lever using the lever handle causes the contact portion to bear against the cutter feed, the tailstock, or the arbor, forcing the cutter feed and the drill member to move parallel to the guide way toward the rotating cue. Using the lever, increased force can be applied to the drill member towards the cue, so that a hole can be readily drilled into the cue.

A cue tip holder adapted to be mounted to the tailstock by insertion into the tailstock bore and securing with the tailstock fastener can also be provided. The cue tip holder includes at least a pair of opposing flexible, resilient fingers separated by finger slots and adapted to grip a cue tip therebetween and against a interior stop post, which is independent of the fingers yet attached to the main tipholder body, prior to attachment of the cue tip to a cue. A cue tip, held by the cue tip holder by flexure of the fingers with a planar side of the cue tip projecting outwardly, can be disposed at a preselected position with respect to a cue mounted to the present invention by adjusting the position of the tailstock using the longitudinal feed knob and the transverse feed knob. With the motor not operating and a mounted cue stationary, by depositing a suitable adhesive on the planar side, the cue tip can be positioned as desired proximate to the cue, using the cutter feed to move the cue tip holder so that the cue tip comes into contact with the cue, thereby mounting the cue tip to the cue.

The coupler can include a speed reduction assembly for decreasing rotational speed of the rotation member resulting from a given rotational speed of the motor. The speed reduction assembly includes a speed reduction pulley having a larger pulley portion and a smaller pulley portion, rotatably mounted to a reduction shaft attached to the projecting arm and disposed generally parallel to the guide way. When the present invention is used with the speed reduction assembly, the belt is mounted between the motor pulley and the larger pulley portion, and a second belt is mounted between the smaller pulley portion and the collet pulley. In this mode, the motor is slightly displaced parallel to the guide way by moving the motor support base with respect to the pivot pin and the first or second retainer pins in order to align the motor pulley with the larger pulley portion, and to align the smaller pulley portion with the collet pulley. Preferably, the locations of the axes of rotation of the three pulleys are situated so one identical belt size can be used for all configurations. Additionally, the speed reduction pulley is held in position only by the belt load of the two belts, and is therefore easily removed without the use of tools.

A slidable stop can be positioned to a selected location along the first longitudinal rail, in order to facilitate movement of the cutter feed to a desired position. A rest bracket can be positioned as desired with respect to the projecting arm by securing with a rest bracket. In addition, mounting of a cue through the collet and removal therefrom can be accomplished by manually tightening the collet body with respect to the collet adjuster, or, can be facilitated by using appropriate lever tools within the pry holes and the adjuster pry holes.

The present invention also includes a pincers press to smooth wrap that may be applied to the butt end of a cue by winding a fine cord material therearound. The pincers press includes a first pincers arm defining a first lateral surface, and a second pincers arm pivotally attached to the first pincers arm at a pincers pivot and defining a second lateral surface proximate to the first lateral surface. A first pressing member is mounted to the first pincers arm to project from the first lateral surface and towards the second pincers arm. A pair of second pressing members are mounted to the second pincers arm, projecting from the second lateral surface and towards the first pincers arm. Each of the pressing members includes at least one rotatable cylinder preferably supported on only one side to improve visibility. A pincers guide member, adapted for slidable coupling to the guide way at the slot, is mounted to the pincers press at the first pincers arm. The pincers press can be slidably moved along the guide way, and simultaneously pinch the butt end between the first pressing member and the second pressing members by pivoting the second pincers arm towards the first pincers arm. Rotation of the butt end is accompanied by rotation of the rotatable cylinders due to frictional contact with the butt end, resulting from pressure applied by the first and second pressing members. In this way, the wrap is smoothed along the length of the butt end.

The present invention further includes an electrically powered smoothing iron for smoothing the wrap. The smoothing iron includes an iron handle and a separately disposed steering knob, and is mounted to an iron guide member for slidable coupling to the guide way at the slot. A temperature control is used to vary the temperature of the smoothing iron through electrical power supplied by an iron power cord. As the butt end of a cue rotates, the smoothing iron can be slidably moved along the guide way and apply heat and pressure to the butt end mounted to the present invention, thereby smoothing the wrap.

The present invention additionally includes a compression die for forming a thread onto a dowel pin exterior surface. The compression die comprises a body having first and second ends, the first end including a tap thread interior surface. A at least one relief slot extends along substantially the entire length of the tap thread while a plurality of chip holes are provided periodically along the tap thread to permit chaff to exit from between the dowel surface and the tap thread interior surface. A cross hole can be provided to receiver a driver to facilitate rotation of the compression die during the tapping process. Additionally, a sizing hole can be provided in the second end having an inner diameter of a size appropriate to gage the dowel with which the compression die is to be employed. The sizing hole can also be used to receive a supporting pin to support and align the compression die during the threading process.

Further features and advantages of the present invention will be apparent from a study of the following portion of the specification, the claims, and the attached drawings.

BRIEF DESCRIPTION OF THE DRAWINGS

FIG. 2 is a perspective view of a cue servicing and repair apparatus representing the present invention, depicted as partially folded.

FIG. 3 is a perspective view of a cue servicing and repair apparatus representing the present invention, depicted as folded and inverted for carrying.

FIG. 19 is a partial, enlarged elevational view of the motor, controller and pivot mount of a cue servicing and repair apparatus representing the present invention, and illustrating in phantom the pivot pin aperture and the retainer pin aperture.

FIG. 20A is a partial, enlarged sectional view of a portion of a cue servicing and repair apparatus representing one embodiment of the present invention, taken along line 20A—20A of FIG. 19.

FIG. 20B is a partial, enlarged sectional view of a portion of a cue servicing and repair apparatus representing an alternative embodiment of the present invention, taken along line 20B—20B of FIG. 6.

FIG. 32 is an enlarged side view of the pincers press of the cue servicing and repair apparatus representing the present invention.

FIG. 33 is an enlarged end view of the pincers press of the cue servicing and repair apparatus representing the present invention.

FIG. 34 is an enlarged top view of the pincers press of the cue servicing and repair apparatus representing the present invention.

DETAILED DESCRIPTION OF THE PREFERRED EMBODIMENTS

The following portion of the specification, taken in conjunction with the drawings, sets forth the preferred embodiments of the present invention. The embodiments of the invention disclosed herein are the best modes contemplated for carrying out the invention in a commercial environment, although it should be understood that various modifications can be accomplished within the parameters of the present invention.

Figure 1:
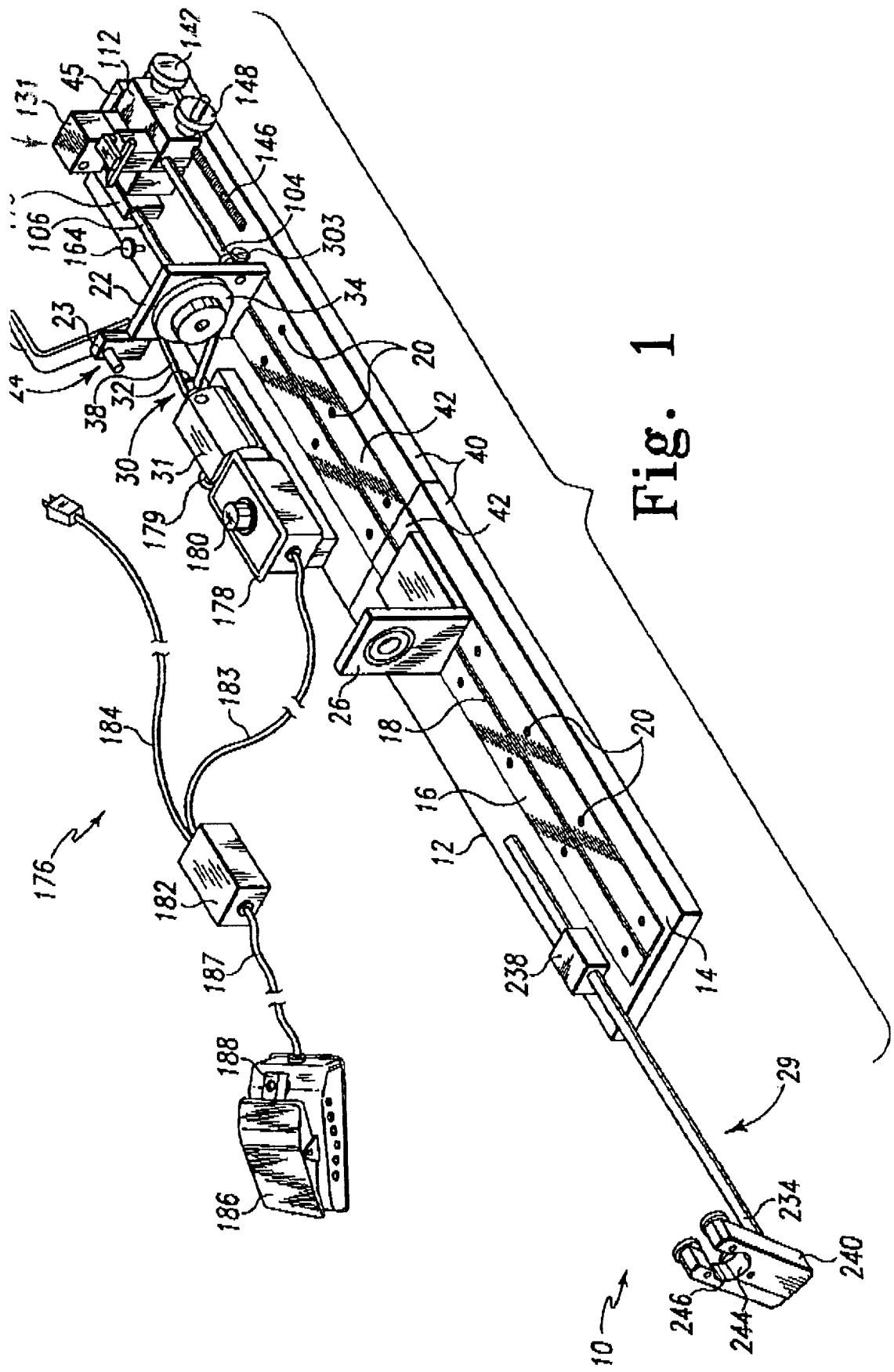
FIG. 1 is a perspective view of a cue servicing and repair apparatus representing the present invention.

Referring now to the drawings for a detailed description of the apparatus of the present invention, reference is first made to FIG. 1 generally depicting an apparatus 10 for servicing and repairing a cue of the present invention including the bed defining generally horizontal planar surface 14. Attached to bed 12 is longitudinal guide way 16 defining generally straight longitudinal slot 18, using fasteners 20. Bed 12 can be formed of a sturdy, rigid, lightweight material such as wood, and guide way 16 can be formed of a durable, sturdy, rigid, lightweight material capable of being formed to have an generally straight slot 18, such as aluminum. Headstock 22 is mounted to bed 12 and includes projecting arm 23 and rotation member 24. Cutter feed 25 is mounted to bed 12 proximate to headstock 22, for movement parallel to planar surface 14 on longitudinal rails 104 and 106 described below. Generally L-shaped support 26 is slidably mounted to guide way 16 at slot 18 and is alignable with headstock 22. Sliding movement of support 26 along guide way 16 is facilitated by at least one support finger, not shown, projecting from support 26 for placement proximate to guide way 16 and capable of sliding engagement within slot 18. Damper 29 can be removably mounted to bed 12, disposed to project from bed 12 away from headstock 22 and generally parallel to slot 18. Coupler 30 is provided for coupling motor 31 to rotation member 24, and includes motor pulley 32 attached to motor 31, collet pulley 34 mounted to rotation member 24, and belt 38 mounted between motor pulley 32 and collet pulley 34.

As depicted in FIGS. 2–3, bed 12 can be formed to include a pair of bed segments 40, and guide way 16 can correspondingly be formed to include a pair of guide way segments 42, with each guide way segment 42 attached to a bed segment 40. Hinge 44 can be disposed between and hingeably attaching together bed segments 40, whereby apparatus 10 can be folded subsequent to removal of elements such as damper 29. After folding, apparatus 10 can be easily transported using handle 45. A bracket could be substituted for hinge 44 for coupling two separable bed segments 40 together to provide both a working conformation as shown in FIG. 1 and a stored conformation as shown generally in FIG. 3.

Figure 4:
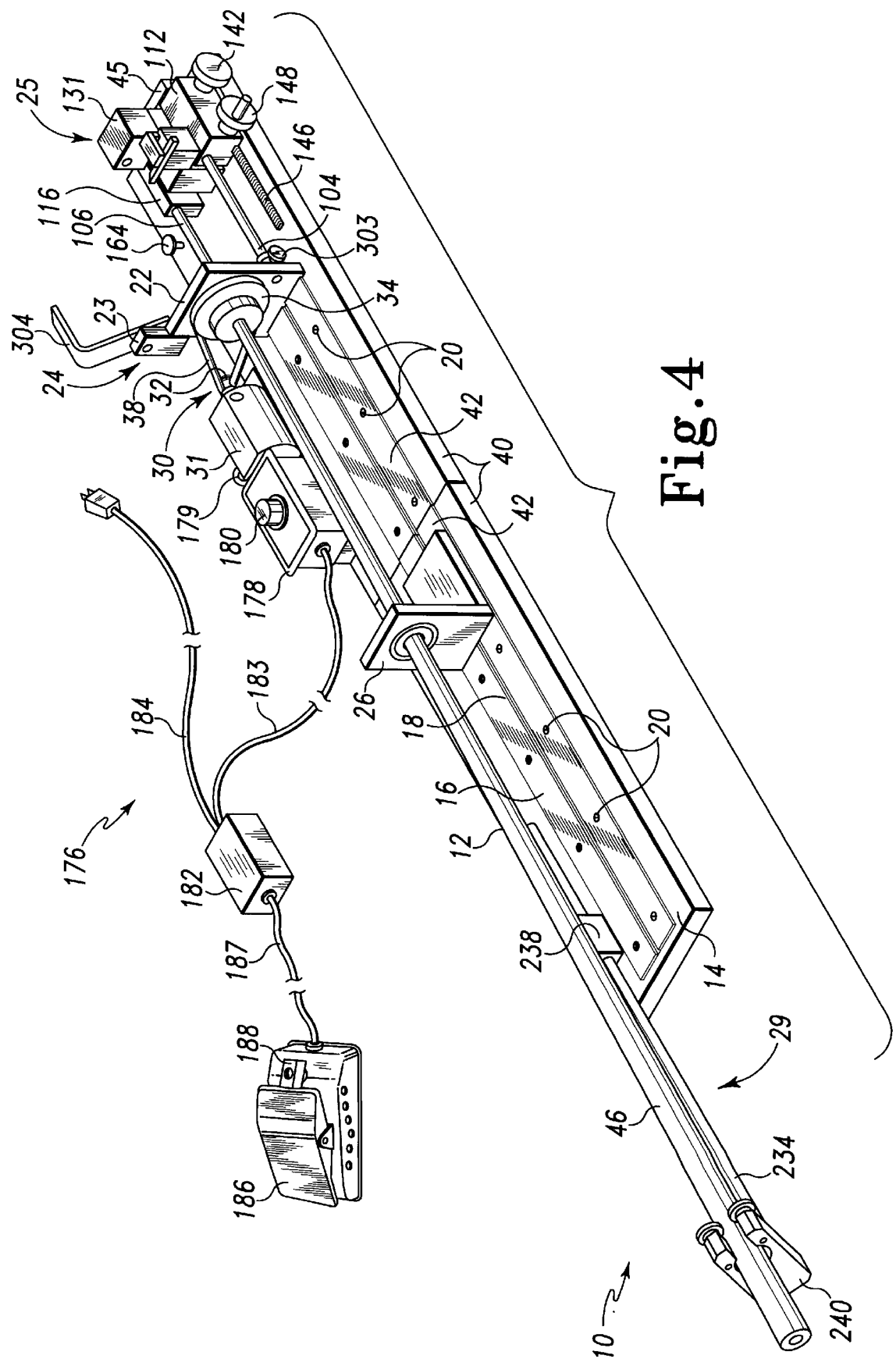
FIG. 4 is a perspective view of a cue servicing and repair apparatus representing the present invention, depicted with a one-piece cue mounted thereto.
Figure 5:
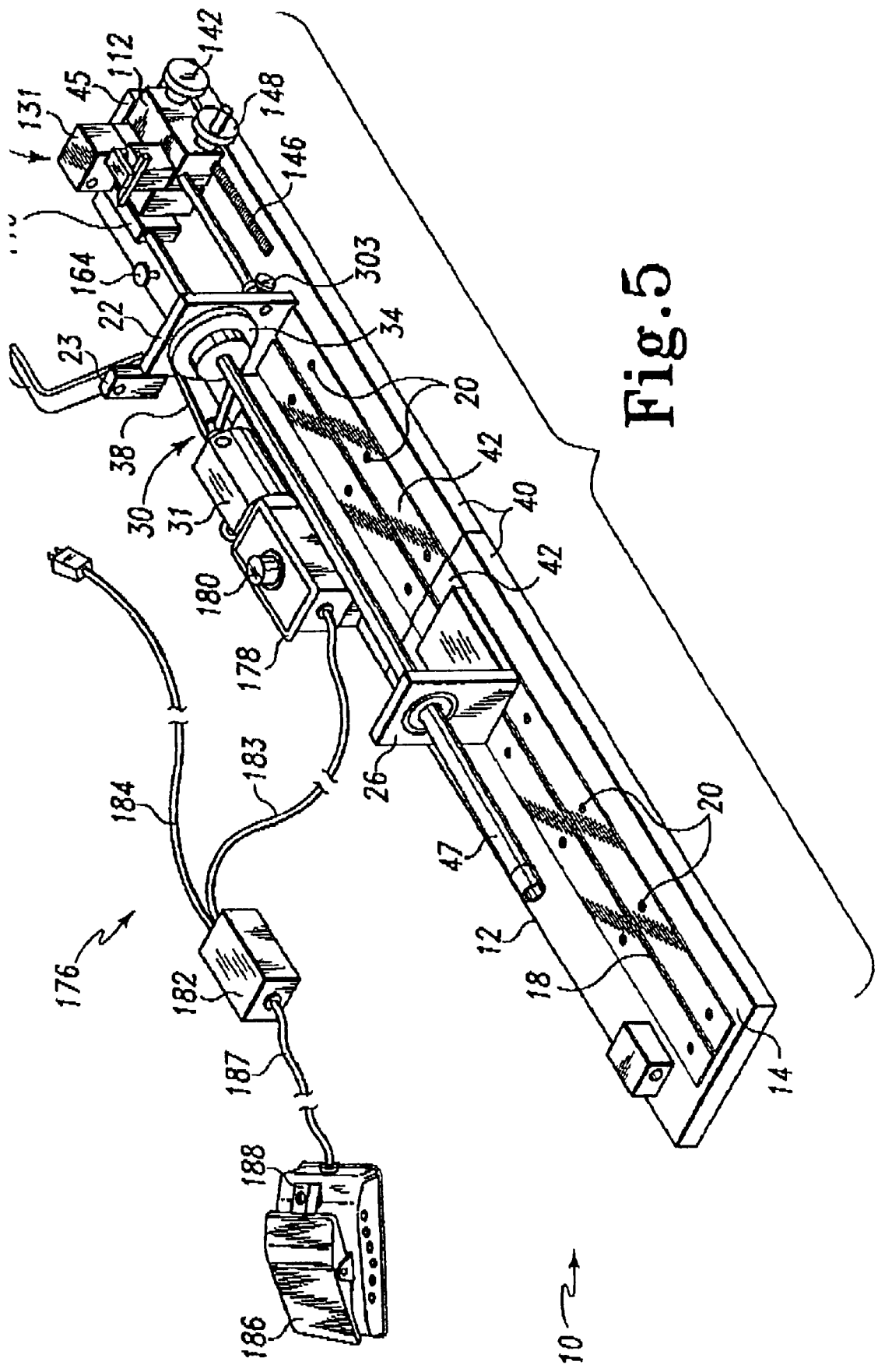
FIG. 5 is a perspective view of a cue servicing and repair apparatus representing the present invention, depicted with the shaft of a two-piece cue mounted thereto.

Referring to FIG. 4, the present invention can be utilized to service or repair one-piece cue 46, by removably mounting one-piece cue 46 generally parallel to guide way 16 and through headstock 22, support 26, and damper 29, as will be further described. In addition, as shown in FIG. 5, the present invention can also be used to service or repair a two-piece cue, by removably mounting a portion 47 of a two-piece cue generally parallel to guide way 16 and through headstock 22 and support 26.

Figure 8:
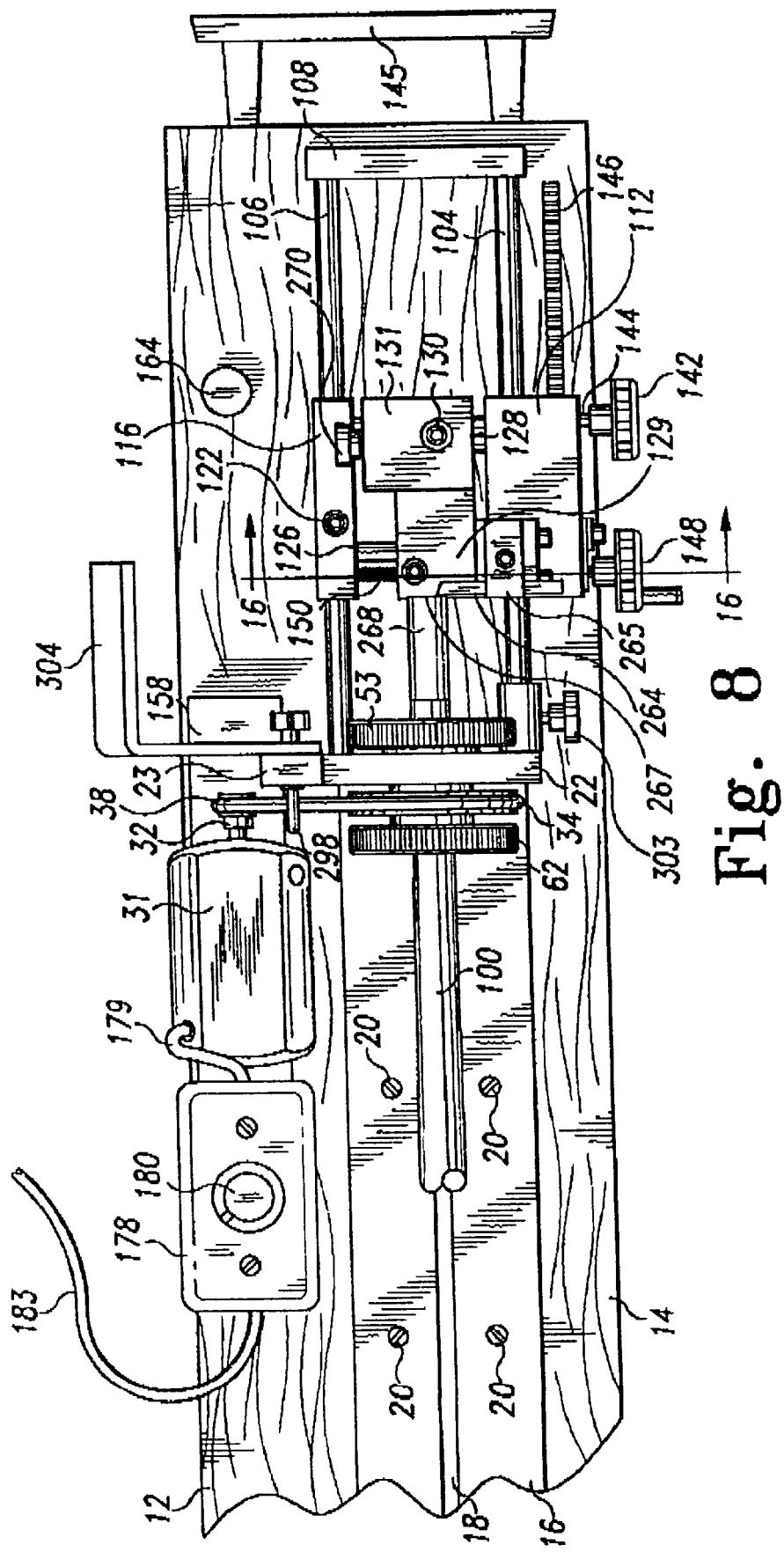
FIG. 8 is a partial, enlarged plan view of a cue servicing and repair apparatus representing the present invention, depicted with the cutter feed proximate to the headstock and with a cue held by the collet.
Figure 9:
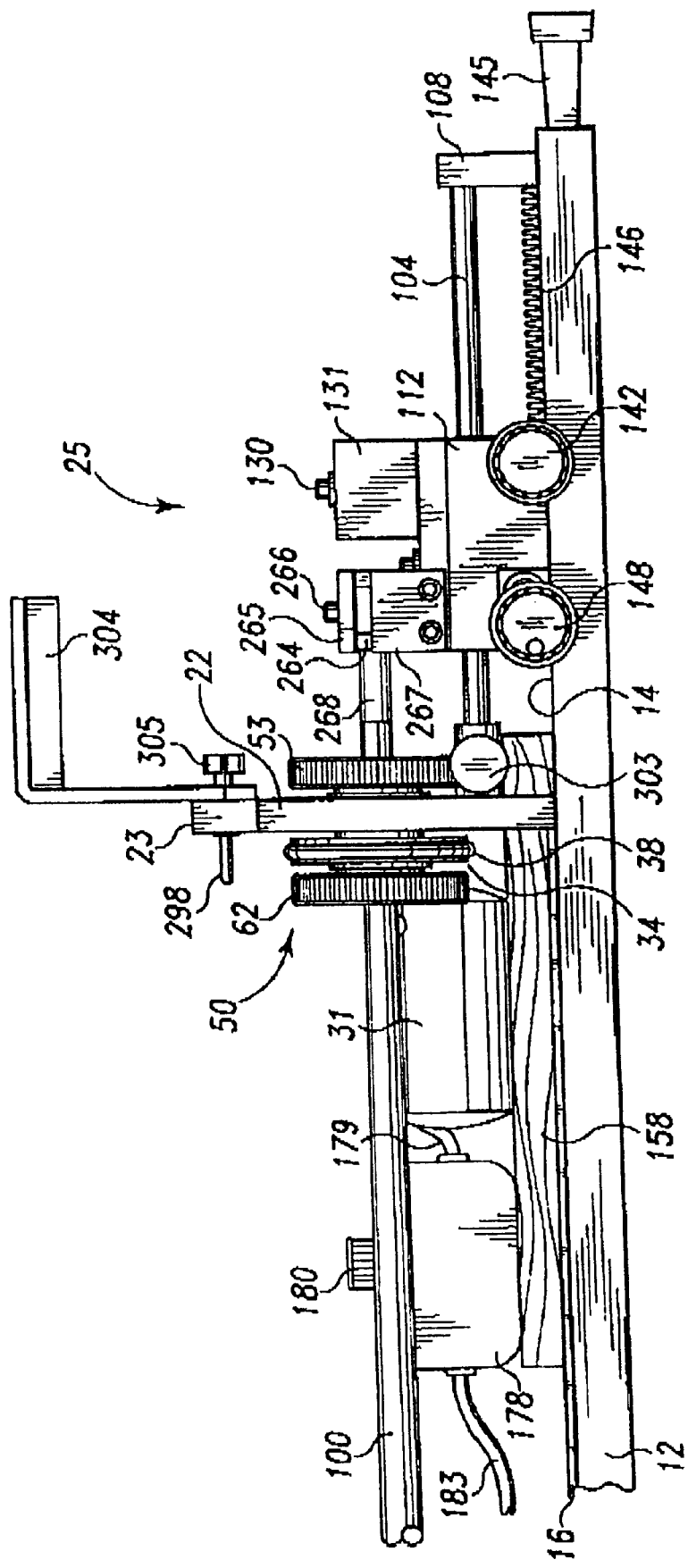
FIG. 9 is a partial, enlarged elevational view of a cue servicing and repair apparatus representing the present invention, depicted with the cutter feed proximate to the headstock and with a cue held by the collet.
Figure 10:
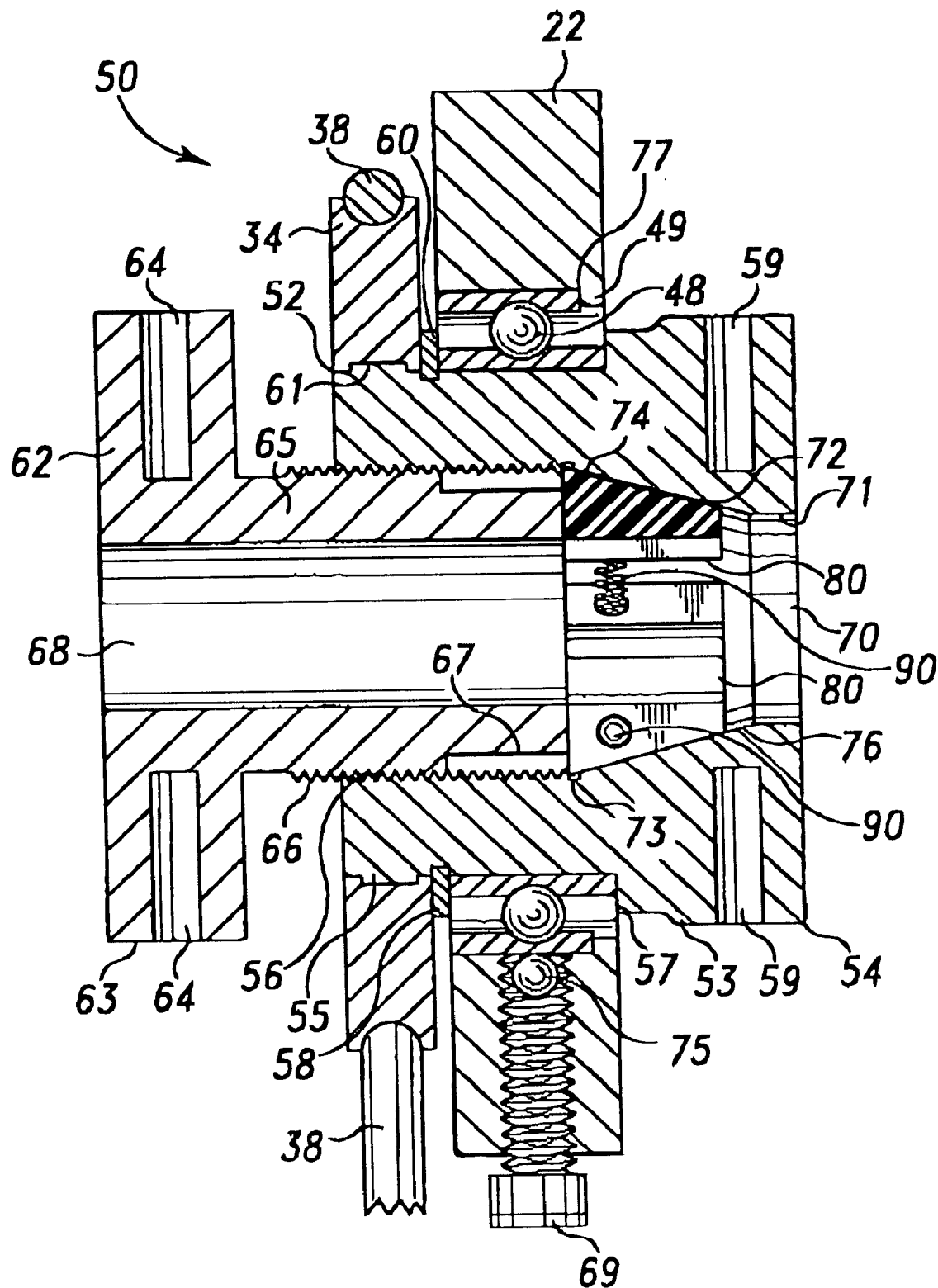
FIG. 10 is an enlarged sectional view of a portion of a cue servicing and repair apparatus representing the present invention, taken along line 10—10 of FIG. 7 and depicted with the collet jaws disposed proximate to the larger diameter end of the collet body.
Figure 11:
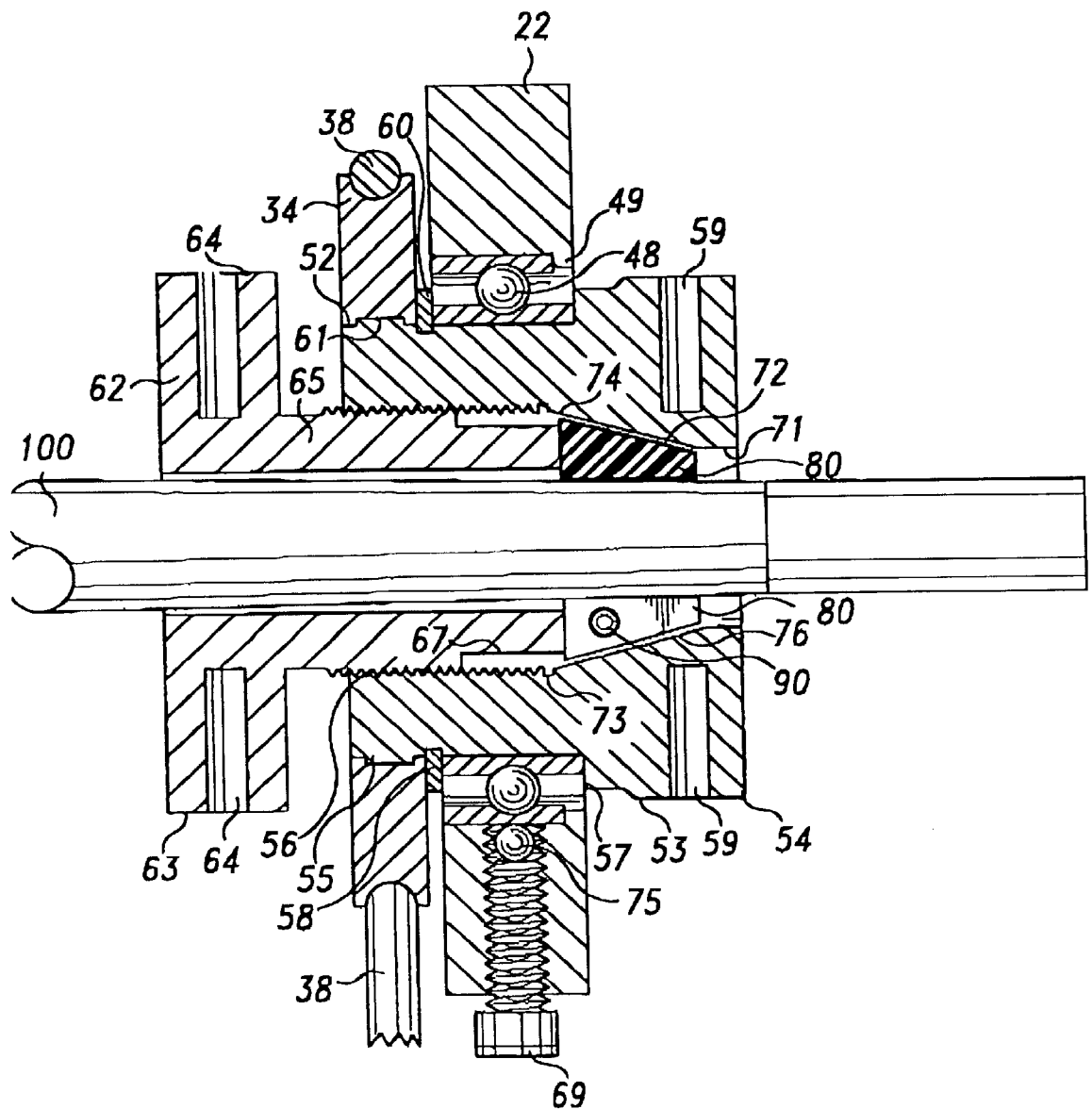
FIG. 11 is an enlarged sectional view of a portion of a cue servicing and repair apparatus representing the present invention, taken along line 10—10 of FIG. 7 and depicted with the collet jaws disposed proximate to the smaller diameter end of the collet body, but depicted with a cue held between the collet jaws.
Figure 12:
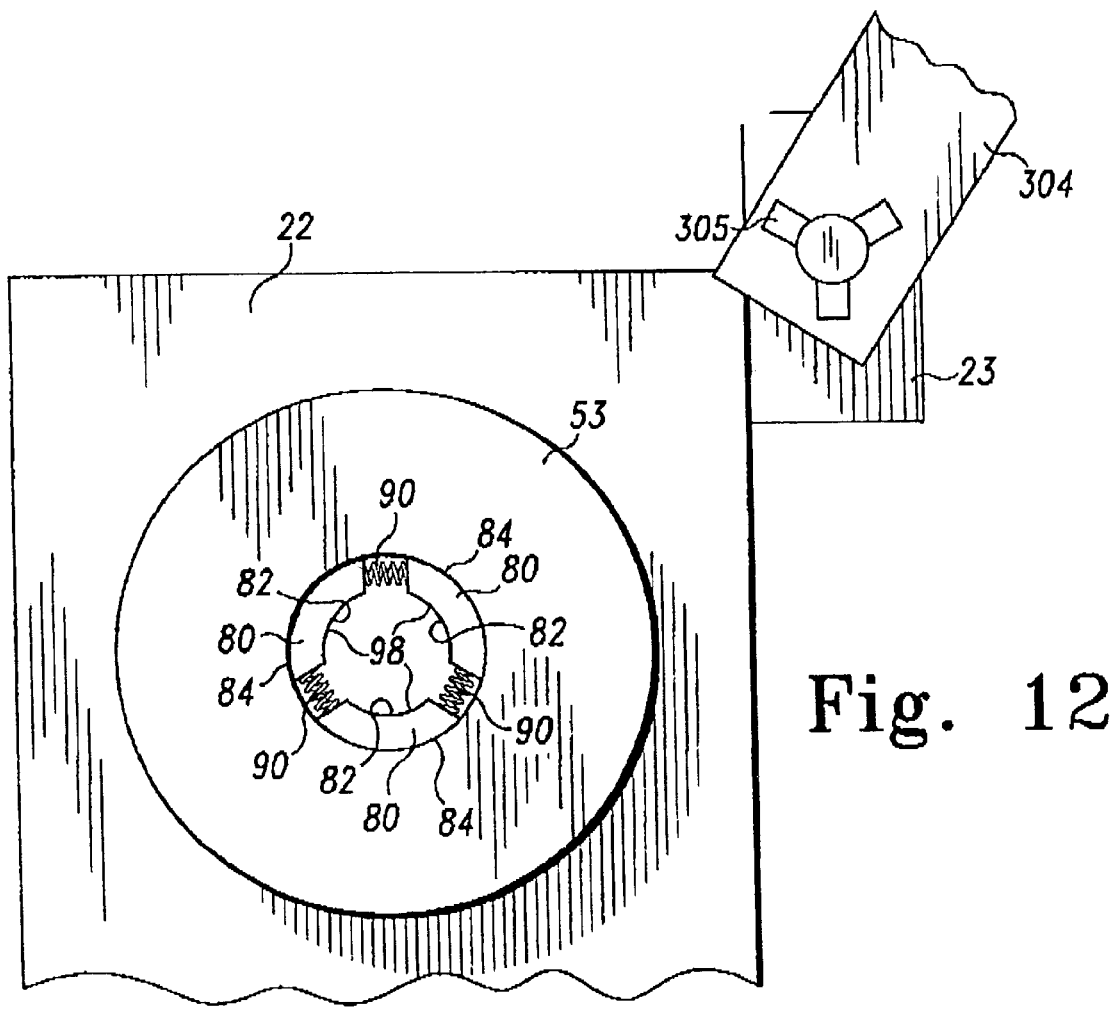
FIG. 12 is an enlarged sectional view of a portion of a cue servicing and repair apparatus representing the present invention, taken along line 12—12 of FIG. 6, illustrated with the collet jaws disposed proximate to the larger diameter end of the collet body.
Figure 13:
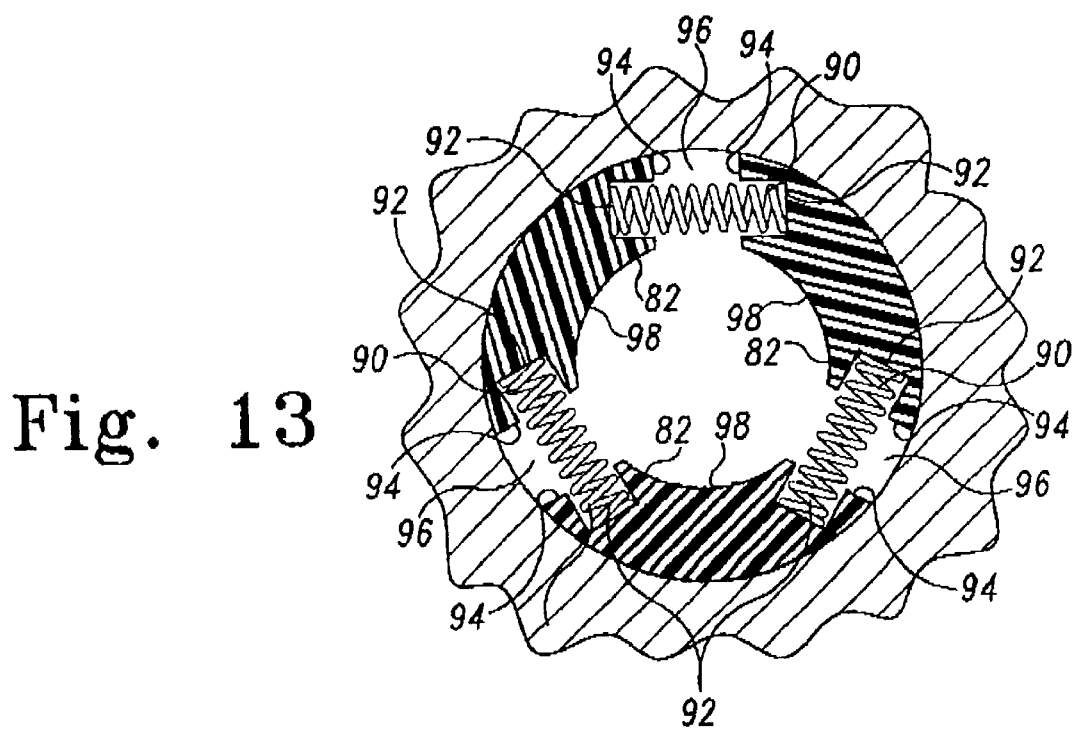
FIG. 13 is an enlarged sectional view of a portion of a cue servicing and repair apparatus representing the present invention, taken along line 13—13 of FIG. 6, illustrated with the collet jaws disposed proximate to the larger diameter end of the collet body.

Illustrated in FIGS. 6–15, rotation member 24 includes collet bearing 48, for example a roller or ball bearing assembly, mounted to headstock 22 within headstock aperture 49, and collet 50. Collet 50 includes collet body 53 having knurled collet body flange 54, collet body neck 55 adapted to fit within collet bearing 48 and including interior threads 56, annular step 57, circumferential snap ring slot 58, and pry holes 59. Collet bearing 48 is mounted to collet body 53 with snap ring 60 disposed in snap ring slot 58 so that collet bearing 48 is sandwiched between annular step 57 and snap ring 60. Collet pulley 34 is mounted to collet body 53 with collet body neck 55 disposed through collet pulley aperture 52 at splines 61. Collet 50 can be simply replaced by a similar collet of differing size by loosening set screw 69 which bears on ball 75 where upon collet 50 including collet bearing 48 and collet pulley 34 can be slipped out of headstock 22 leftward as seen in FIGS. 10 and 11.

Collet 50 further includes collet adjuster 62 having knurled adjuster flange 63 defining adjuster pry holes 64, adjuster neck 65 including adjuster exterior threads 66 adapted for engagement with interior threads 56 of collet body 53 and projecting annular collar portion 67. Collet adjuster 62 also defines adjuster aperture 68. Collet body 53 defines passage 70 therethrough including exterior cylindrical surface 71, generally conical surface 72, and interior cylindrical surface 73. Generally conical surface 72 includes larger diameter end 74 and smaller diameter end 76.

Figure 14:
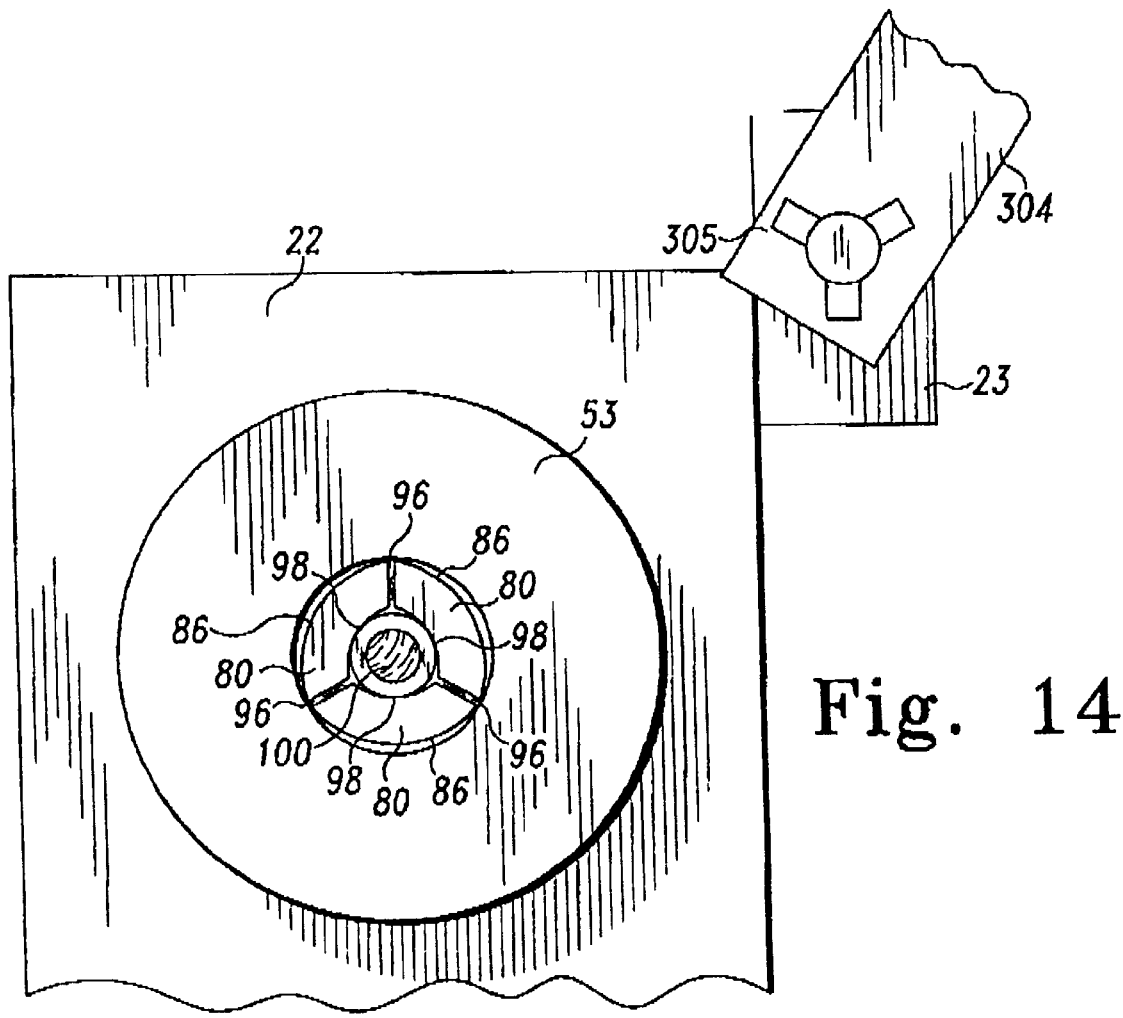
FIG. 14 is an enlarged sectional view of a portion of a cue servicing and repair apparatus representing the present invention, taken along line 12—12 of FIG. 6, illustrated with the collet jaws disposed proximate to the smaller diameter end of the collet body, but depicted with a cue held between the collet jaws.
Figure 15:
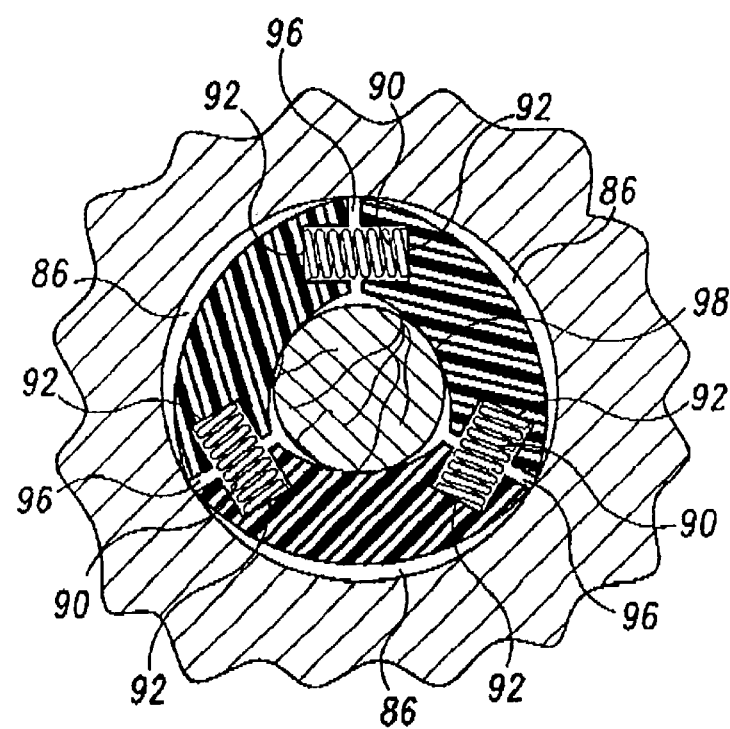
FIG. 15 is an enlarged sectional view of a portion of a cue servicing and repair apparatus representing the present invention, taken along line 13—13 of FIG. 6, illustrated with the collet jaws disposed proximate to the smaller diameter end of the collet body, but depicted with a cue held between the collet jaws.

Three collet jaws 80 are provided which can be formed from a variety of materials including neoprene, structural plastics and even steel. A preferred material is a flexible, resilient thermoplastic material available under the trade name Delrin. Collet jaws 80 are slidably disposed within passage 70 proximate to conical surface 72. Each collet jaw 80 is formed to have a generally cylindrical collet jaw inner surface 82 and a generally conical collet jaw outer surface 84 which corresponds to at least a portion of conical surface 72 proximate to larger diameter end 74. In this way, as each collet jaw 80 slides towards smaller diameter end 76, an arcuate gap 86 is defined between each collet jaw outer surface 84 and a portion of the conical surface 72 as shown in FIGS. 14–15. Biasing elements, such as compression coil springs 90, are coupled to collet jaws 80 by mounting in jaw holes 92 defined in collet jaw sides 94 and act to urge collet jaws 80 generally radially outwardly against passage 70 and away from the other collet jaws 80, towards enlarging the size of lateral gaps 96 between adjacent collet jaws 80. Collet adjuster 62 is adapted for slidably moving collet jaws 80 towards smaller diameter end 76 as collet adjuster 62 is threadably tightened into collet body 53.

As illustrated in FIGS. 14–15, as collet adjuster 62 is threadably tightened, central portions 98 of collet jaw inner surfaces 82 are capable of bearing against a portion of cue 100 inserted through passage 70 and collet jaws 80, so that arcuate gaps 86 are reduced in size by flexure of collet jaws 80 towards conical surface 72. This flexing distributes as well as lowers the load on cue 100 thus reducing the potential for damage to the cue. Motor 31 can produce rotation of collet 50 and cue 100 through coupling of motor pulley 32 to belt 38 and collet pulley 34.

Rotation member 24 can be removably mounted as a unit to headstock 22 by fastening collet bearing 48 within headstock aperture 49 and against edge 77 of headstock aperture 49 using a bearing fastener consisting of a compressible non-metallic ball 75 held in fixed relation by screw 69 as seen in FIGS. 10 and 11. In this way, rotation member 24 can be replaced with a substitute rotation member 24 such as a rotation member 24 including a collet 50 having collet body 53 and collet jaws 80 that are adapted to hold a work piece of a larger or smaller diameter.

Figure 6:
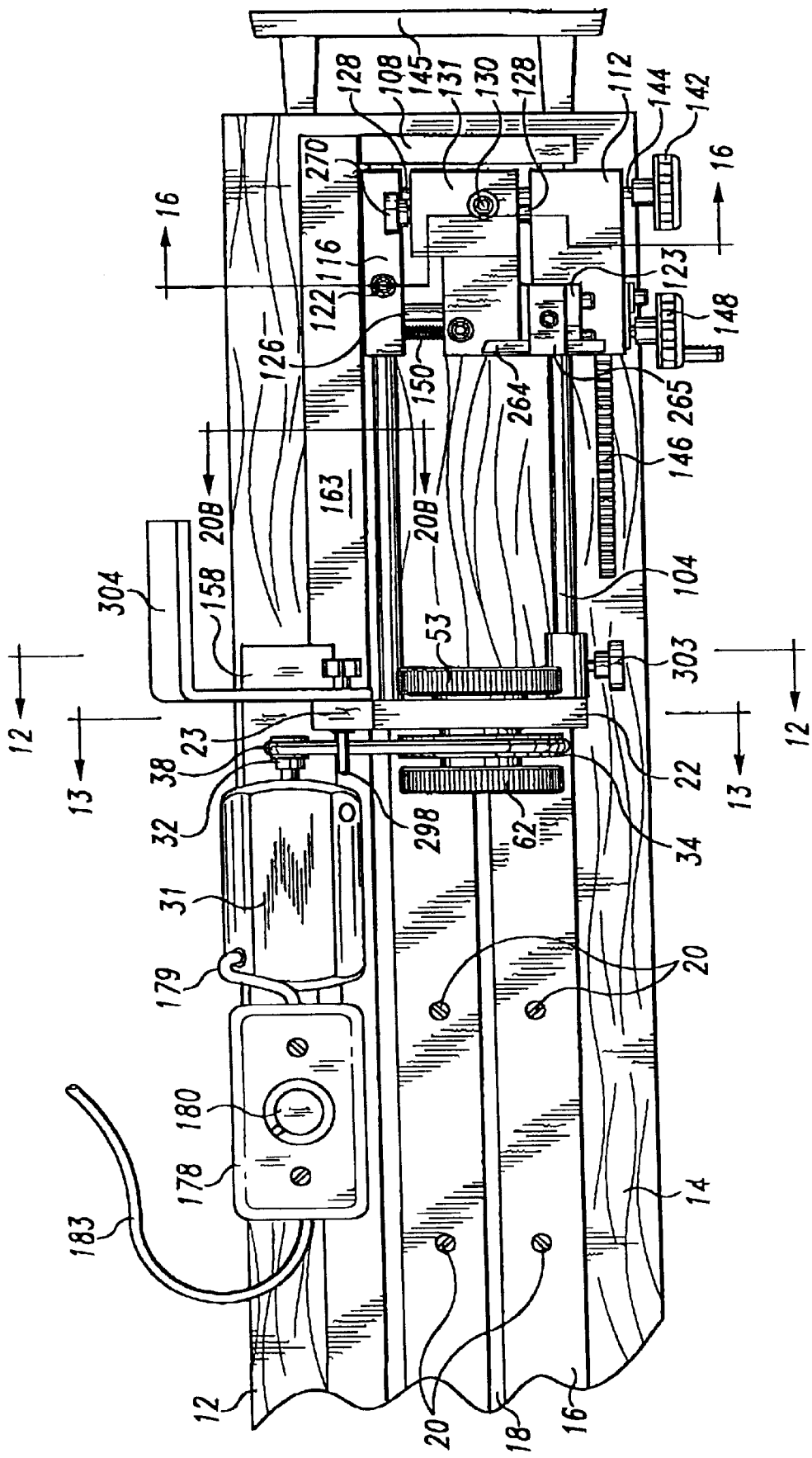
FIG. 6 is a partial, enlarged plan view of a cue servicing and repair apparatus representing the present invention including an alternative motor mounting.
Figure 7:
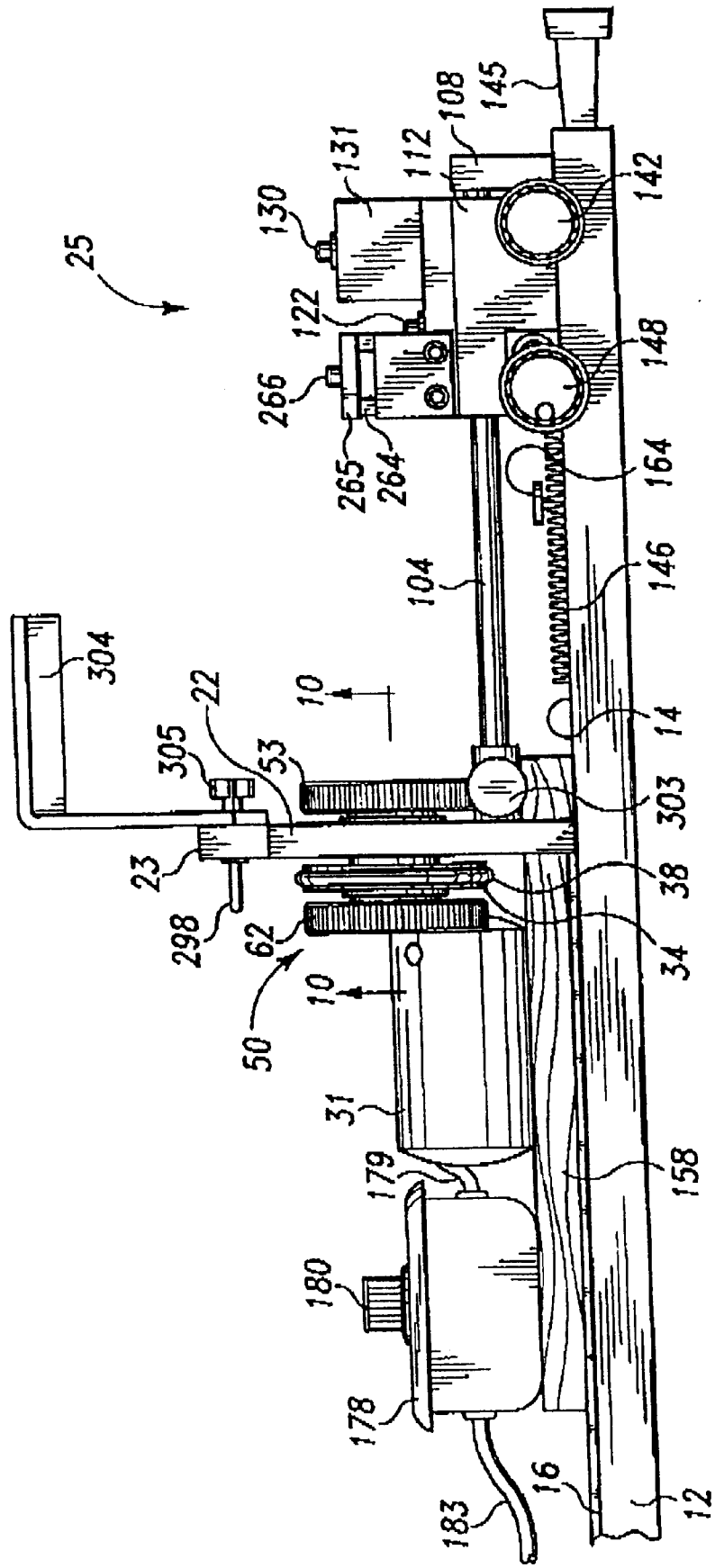
FIG. 7 is a partial, enlarged elevational view of a cue servicing and repair apparatus representing the present invention.
Figure 16:
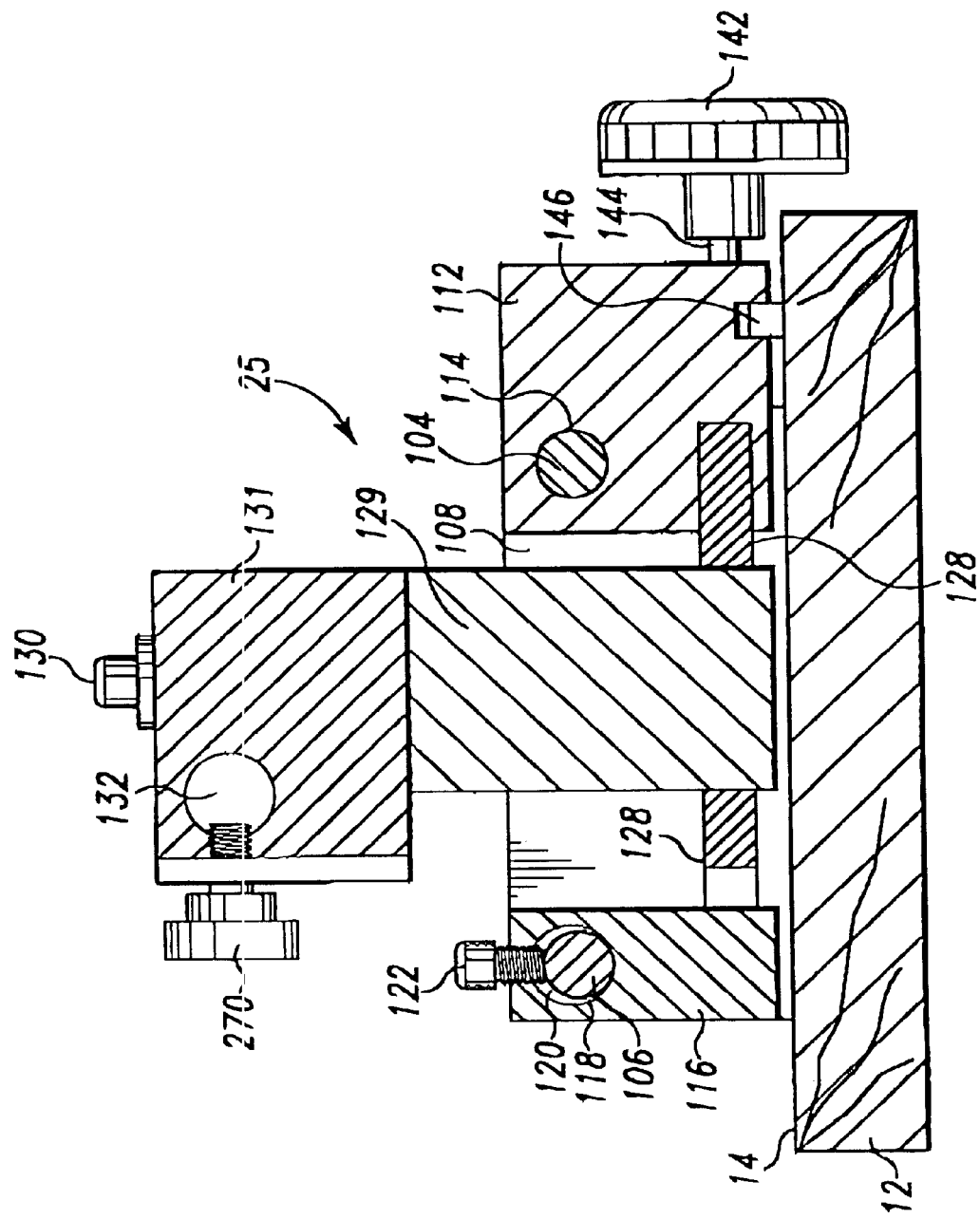
FIG. 16 is an enlarged sectional view of a portion of a cue servicing and repair apparatus representing the present invention, taken along line 16—16 of FIG. 6.

Referring to FIGS. 6, 7, and 16, cutter feed 25 is mounted to bed 12 using first longitudinal rail 104 and second longitudinal rail 106 attached between headstock 22 and rail support 108 mounted to bed 12, so that cutter feed 25 is disposed for movement generally parallel to planar surface 14 and guide way 16. First axial block 112 defines first aperture 114 that generally corresponds with first longitudinal rail 104 but is slightly larger than first longitudinal rail 104, whereby first axial block 112 is capable of sliding movement along first longitudinal rail 104, with first longitudinal rail 104 disposed within first aperture 114. Similarly, second axial block 116, having axial block surface 118 defining second aperture 120 that generally corresponds with second longitudinal rail 106, is mounted for sliding movement surrounding and along second longitudinal rail 106. Second aperture 120 is substantially larger than second longitudinal rail 106, and first adjustment member, such as first set screw 122, is threadably mounted within second longitudinal block 116 for holding second longitudinal rail 106 against a portion of axial block surface 118 at an adjustable pressure to eliminate rotational play around the axis of the first rail as well as provide the desired amount of resistance to sliding. This feature also eliminates the criticality of the relative spacing between the rails 104 and 106.

First transverse rail 126 and second transverse rail 128 are disposed generally parallel to planar surface 14 and perpendicular to guide way 16, and are mounted between and attach first axial block 112 to second axial block 116. In a manner similar to that previously described with respect to first and second apertures 114 and 120, transverse block 129 defines therethrough a first opening, not shown, that corresponds with but is slightly larger than first transverse rail 126, and further defines a second opening, not shown, that corresponds with but is substantially larger than second transverse rail 128. Transverse block 129 is mounted for sliding movement along first and second transverse rails 126 and 128, with first transverse rail 126 disposed within the first opening and second transverse rail 128 disposed within the second opening. Second adjustment member, such as second set screw 130, is threadably mounted within transverse block 129 for holding second transverse rail 128 within the second opening at a predetermined pressure. Tailstock 131, defining tailstock bore 132, is mounted to transverse block 129, and is capable of movement with transverse block 129 parallel to planar surface 14, as will be described.

Figure 17:
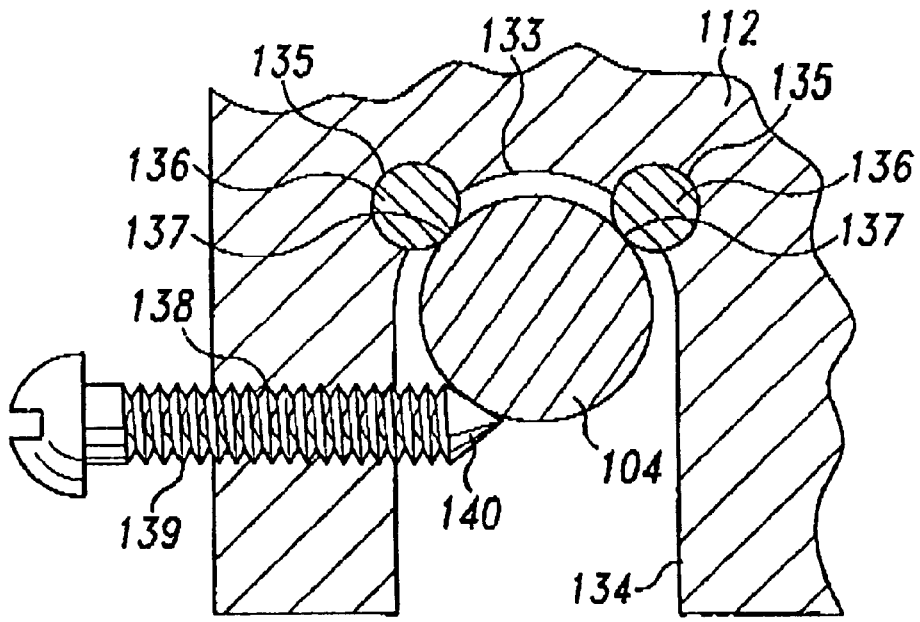
FIG. 17 is an enlarged partial sectional view of a portion of a cue servicing and repair apparatus representing the present invention, taken along line 16—16 of FIG. 6, depicting the first longitudinal rail in contact between two bearing rods and the retaining fastener.

Alternatively, as shown in FIG. 17, first axial block 112 can define first aperture 114 including generally rounded upper portion 133 and open lower portion 134, with upper portion 133 generally corresponding with and substantially larger than first longitudinal rail 104. First axial block 112 can further define a pair of spaced-apart bearing channels 135, with each bearing channel 135 disposed generally parallel to and communicating with upper portion 133. A bearing rod 136 can be mounted in each bearing channel 135 so that a portion of each bearing rod 136 projects within first aperture 114, forming a contact surface 137. Bearing rods 136 can be formed of any of a variety of suitable bearing materials, including relatively hard plastics and metals such as brass. With bearing rods 136 so disposed, first axial block 112 can be placed over and partially surrounding first longitudinal rail 104, with contact surfaces 137 contacting first longitudinal rail 104, so that first axial block 112 is capable of sliding movement with respect to first longitudinal rail 104. First axial block 112 can further define tapped retaining fastener opening 138 disposed generally normal to first aperture 114 and below bearing channels 135. Retaining fastener 139, having generally tapered tip 140, can be threadably disposed in retaining fastener opening 138. As shown in FIG. 17, first longitudinal rail 104 can be held in three-point contact between bearing rods 136 and retaining fastener 139, with tapered tip 140 disposed in contact with the lower portion of first longitudinal rail 104 with force necessary so that first longitudinal rail 104 bears against bearing rods 136 at a preselected pressure to provide desired sliding movement of first axial block 112 with respect to first longitudinal rail 104.

Figure 18:
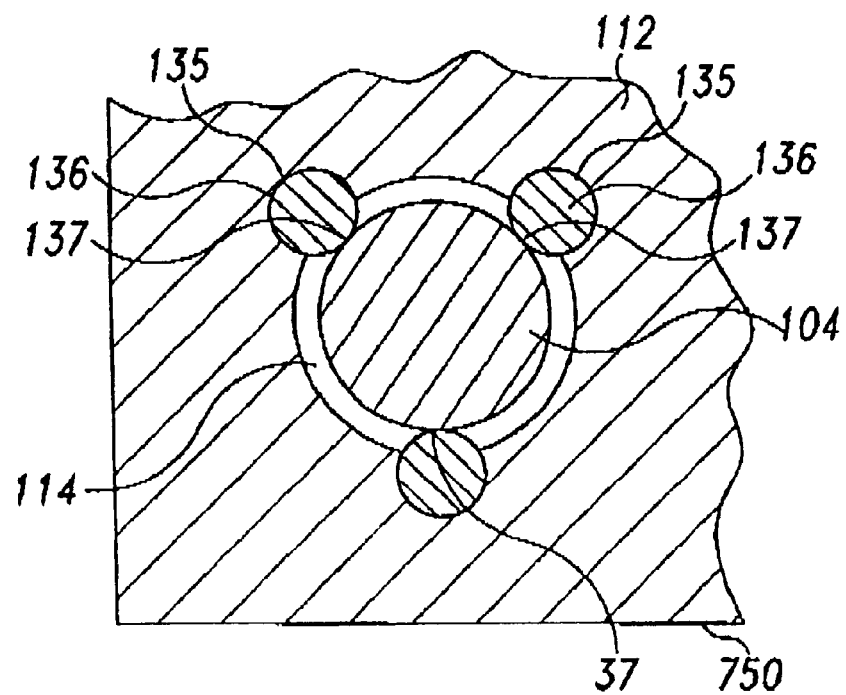
FIG. 18 is an enlarged partial sectional view of a portion of a cue servicing and repair apparatus representing the present invention, taken along line 16—16 of FIG. 6, depicting the first longitudinal rail in contact between three bearing rods.

In addition, more or less than a pair of bearing rods 136 can be utilized in the present invention. For instance, as shown in FIG. 18, first axial block 112 can be formed with first aperture 114 substantially larger than and disposed to completely surround first longitudinal rail 104, with first axial block 112 defining three spaced apart bearing channels 135. With one of three bearing rods 136 mounted in each of bearing channels 135, first axial block 112 can be mounted for sliding movement along first longitudinal rail 104, surrounding first longitudinal rail 104 and in sliding contact with a portion of bearing rods 136 projecting into first aperture 114.

In the event that bearing rods 136 become worn, resulting in loose sliding movement of first axial block 112 along first longitudinal rail 104, retaining fastener 139 can be tightened to again obtain the desired sliding movement. Further, bearing rods 136 can be easily replaced by sliding old bearing rods 136 out of bearing channels 135, and slidably inserting replacement bearing rods 136 with bearing channels 135 without removal of the longitudinal rails.

It will be understood, of course, that second axial block 116 can be mounted to second longitudinal rail 106 in a manner entirely similar to that just described with respect to first axial block 112 and first longitudinal rail 104, and that transverse block 129 can also be mounted to either or both of first and second transverse rails 126 and 128 in an entirely similar manner.

In use, cutter feed 25 can be adjustably moved parallel to guide way 16 from the position shown in FIGS. 6 and 7 to a desired position closer to collet 50, for instance to the position depicted in FIGS. 8 and 9, by rotation of longitudinal feed knob 142 coupled to longitudinal feed shaft 144 having a gear, not shown, engaged with gear rack 146 in a well-known manner. The gear rack 146 is preferably covered by a gear rack cover 141, shown in FIGS. 24 and 39, to prevent shavings from fouling the gear rack 146. The gear rack cover 141 includes a lower surface 143 in sliding contact with planar surface 14. The lower surface 143 includes a longitudinal slot 145 receiving the gear rack 146. The gear rack cover 141 is engaged by pin 147 fixed to axial block 112 so that any longitudinal movement of cutter feed 25 also causes a corresponding movement of gear rack cover 141. Application of a downward force of the top of the gear rack cover 141 causes frictional force between the gear rack cover 141 and planar surface 14 to increase, which allows the gear rack cover 141 to be employed as a break to prevent undesirable longitudinal movement of cutter feed 25. The Longitudinal feed shaft 144 is disposed between first and second axial blocks 112 and 116, and slidably disposed through transverse block 129.

Figure 39:
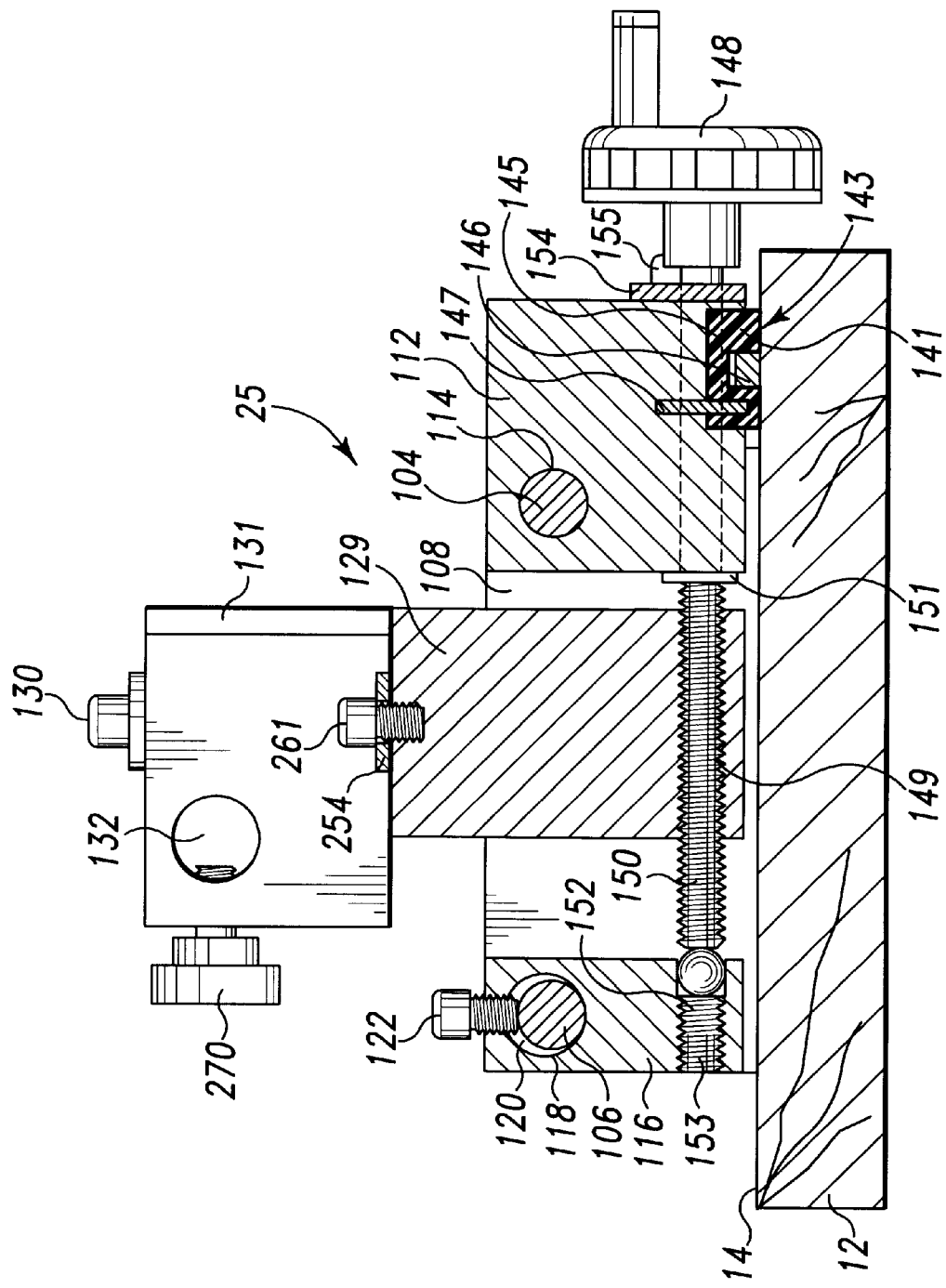
FIG. 39 is a sectional view of a portion of a cue servicing and repair apparatus representing the present invention, taken along line 39—39 of FIG. 24.

Similarly, transverse block 129 can be adjustably moved perpendicular to guide way 16 to a desired position, sliding along longitudinal feed shaft 144 and first and second transverse rails 126 and 128, by rotation of transverse feed knob 148 coupled to threaded transverse feed shaft 150 disposed between first and second axial blocks 112 and 116, and threadably engaged with a tapped hole 149 defined in transverse block 129 shown in FIG. 39. The transverse feed shaft is transversely held between washer 151 and ball 152 positioned by setscrew 153. A flexible outboard bearing 154 is secured to axial block 112 by fastener 155 to provide a non-binding alignment for transverse feed shaft 150. In this way, cutter feed 25 can be positioned at a desired location with respect to a cue mounted to the present invention, in order to perform repair and servicing operations, as will be described.

As depicted in FIGS. 19 and 20A, the present invention includes pivot mount 156 for mounting motor 31 to bed 12. Pivot mount 156 includes motor support base 158 attached to motor 31, pivot pin 160 attached to bed 12, first retainer pin 162 attached to bed 12 proximate to support 26, and second retainer pin 164 attached to bed 12 proximate to tailstock 131. At opposing ends 166 and 168 of motor support base 158, pivot pin aperture 170 and retainer pin aperture 172 are defined. The cross-sectional shape of pivot pin aperture 170 is selected to correspond to the shape of pivot pin 160 so that, as will be described, motor support base 158 is capable of sliding movement with respect to pivot pin 160 while pivot pin 160 is captured within pivot pin aperture 170. Similarly, by selecting first and second retainer pins 162 and 164 to have substantially similar dimensions, and selecting the cross-section of retainer pin aperture 172 to correspond to the shape of first and second retainer pins 162 and 164, motor support base 158 is capable of sliding movement with respect to first retainer pin 162 when first retainer pin 162 is captured within retainer pin aperture 172, and motor support base 158 is capable of sliding movement with respect to second retainer pin 164 when second retainer pin 164 is captured within retainer pin aperture 172. In this way, motor 31 can be detachably mounted to pivot pin 160 and first retainer pin 162 in a first position proximate to support 26 as illustrated in FIG. 6.

Figure 21:
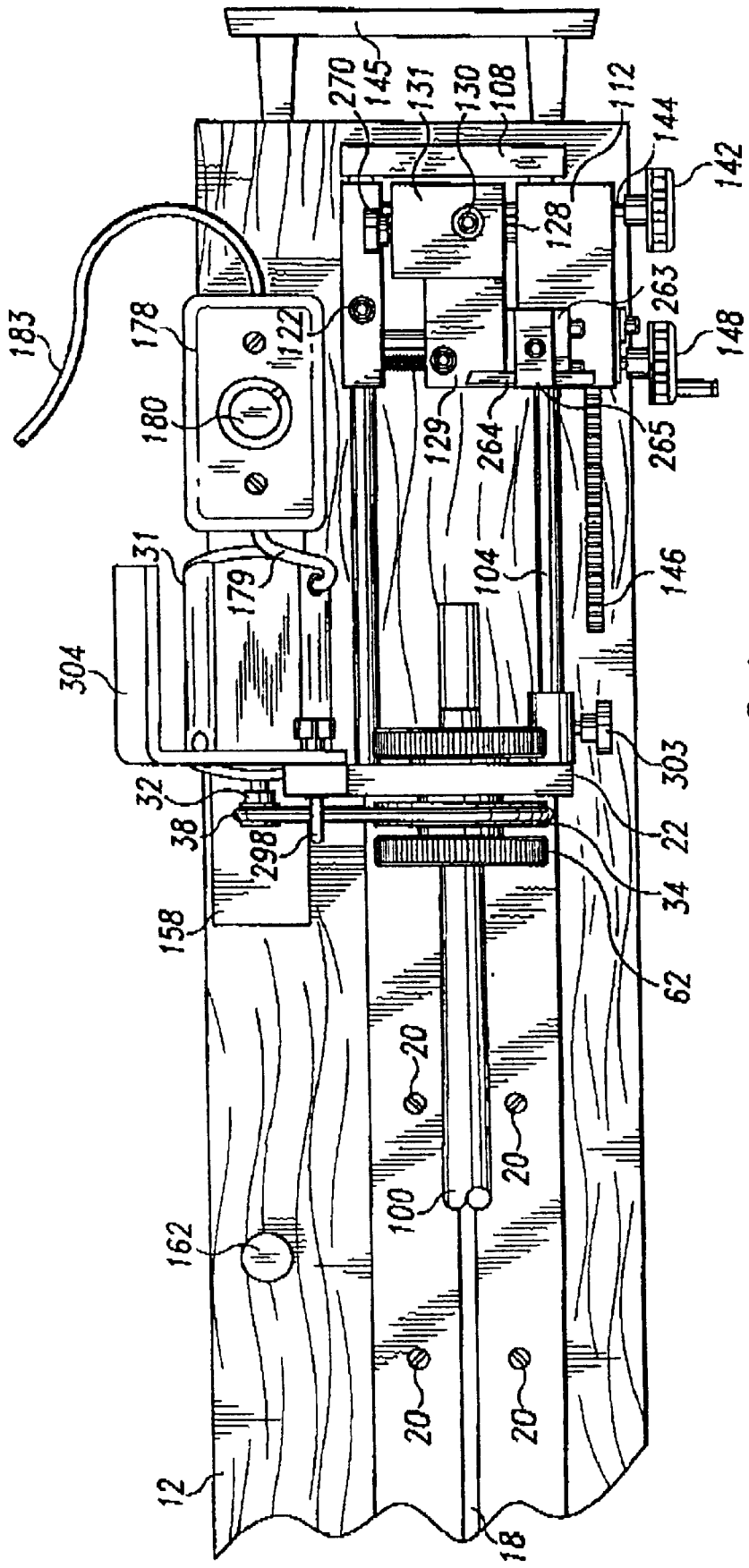
FIG. 21 is a partial, enlarged plan view of a cue servicing and repair apparatus representing the present invention with the motor disposed proximate to the tailstock.

Alternatively, motor 31 can be detachably mounted to pivot pin 160 and second retainer pin 164 in a second position proximate to tailstock 131 as shown in FIG. 21. With motor 31 disposed in the first position, rotation member 24 is driven to rotate in a first direction by motor 31, and the region of bed 12 proximate to cutter feed 25 is uncluttered by motor 31, permitting operations utilizing cutter feed 25 to be easily performed. Conversely, with motor 31 disposed in the second position, rotation member 24 is driven to rotate in an opposite direction by motor 31, and the region of bed 12 between headstock 22 and support 26 is uncluttered by motor 31, permitting operations performed between headstock 22 and support 26 to be easily accomplished. Pivot pin aperture 170 is adapted for pivoting coupling of motor support base 158 to pivot pin 160 and retainer pin aperture 172 is adapted for coupling to first retainer pin 162 when motor 31 is disposed in the first position, and to second retainer pin 164 when motor 31 is disposed in the second position.

Another embodiment for mounting the motor 31 to the bed 12 is shown in FIGS. 6 and 20B wherein the motor support base 158 includes a pair of outwardly facing longitudinal slots 159 and 161. An motor support guide rail 163 is secured to the top planar surface 14 of bed 12 parallel to longitudinal guide ways 16. It will be appreciated that either slot 159 or slot 161 can engage guide rail 163, and that any change in engagement between the slots 159 and 161 will achieve the same reversal in rotation of rotation member 24 as was achieved by the embodiment illustrated in FIGS. 19 and 20A. One advantage provided by the embodiment shown in FIGS. 6 and 20B is that the motor 31 can be operatively positioned at any longitudinal position desired along substantially the entire length of bed 12 rather than the dedicated positions established by the pins 160, 162 and 164. It will be recognized that utilizing either embodiment, motor 31 can be moved between the first and second positions without the need for tools.

Shown in FIGS. 1, 4, and 5, controller 176 is provided for controlling the rotational speed of motor 31, and therefore the rotational speed of cue 100 mounted to apparatus 10. Controller 176 includes first speed control 178 mounted to motor support base 158 and electrically connected to motor 31 by motor wire 179. First speed control 178 is adapted to operated by a hand using adjustment knob 180, and is electrically connected to junction unit 182 by first speed control wire 183. Electrical power is supplied to junction unit 182 by power cord 184. Second speed control 186 is adapted to be operated by a foot, and is electrically connected to junction unit 182 by second speed control wire 187 so that second speed control wire 187 is electrically connected in series with first speed control 178. By connecting first and second speed controls 178 and 186 in this manner, and by adjusting first speed control 178 to limit maximum rotational speed to a preselected level appropriate to a particular task being performed with the present invention, second speed control 186 can be used to vary rotational speed up to the preselected level. Moreover, by utilizing stop 188 to uniquely hold second (foot) speed control 186 in a position that provides minimum electrical resistance, the rotational speed of motor 31 can be controlled entirely by first speed control 178.

Figure 22:
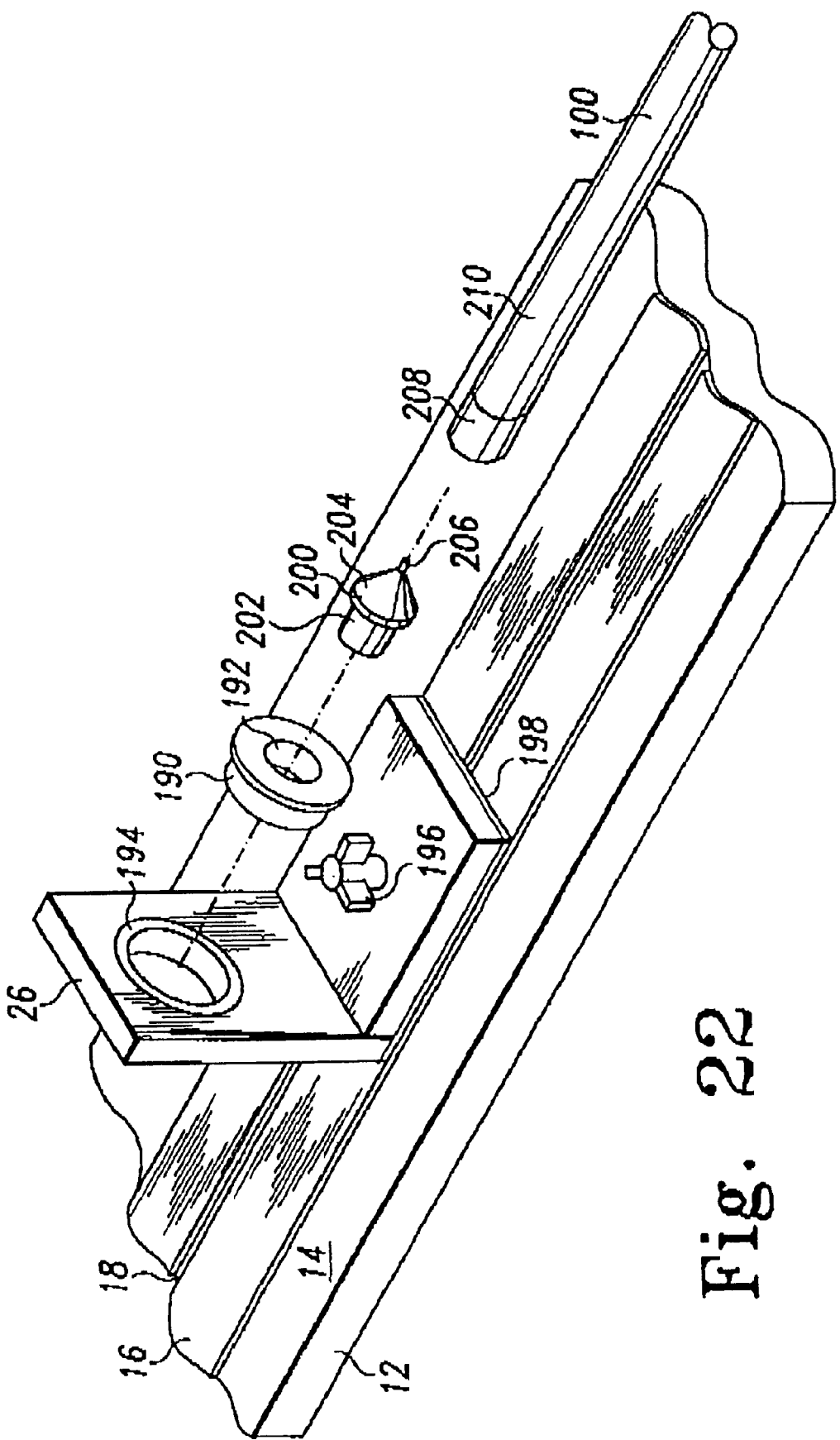
FIG. 22 is a partial, enlarged, exploded perspective view depicting the support, sleeve and butt segment gripper of a cue servicing and repair apparatus representing the present invention.
Figure 23:
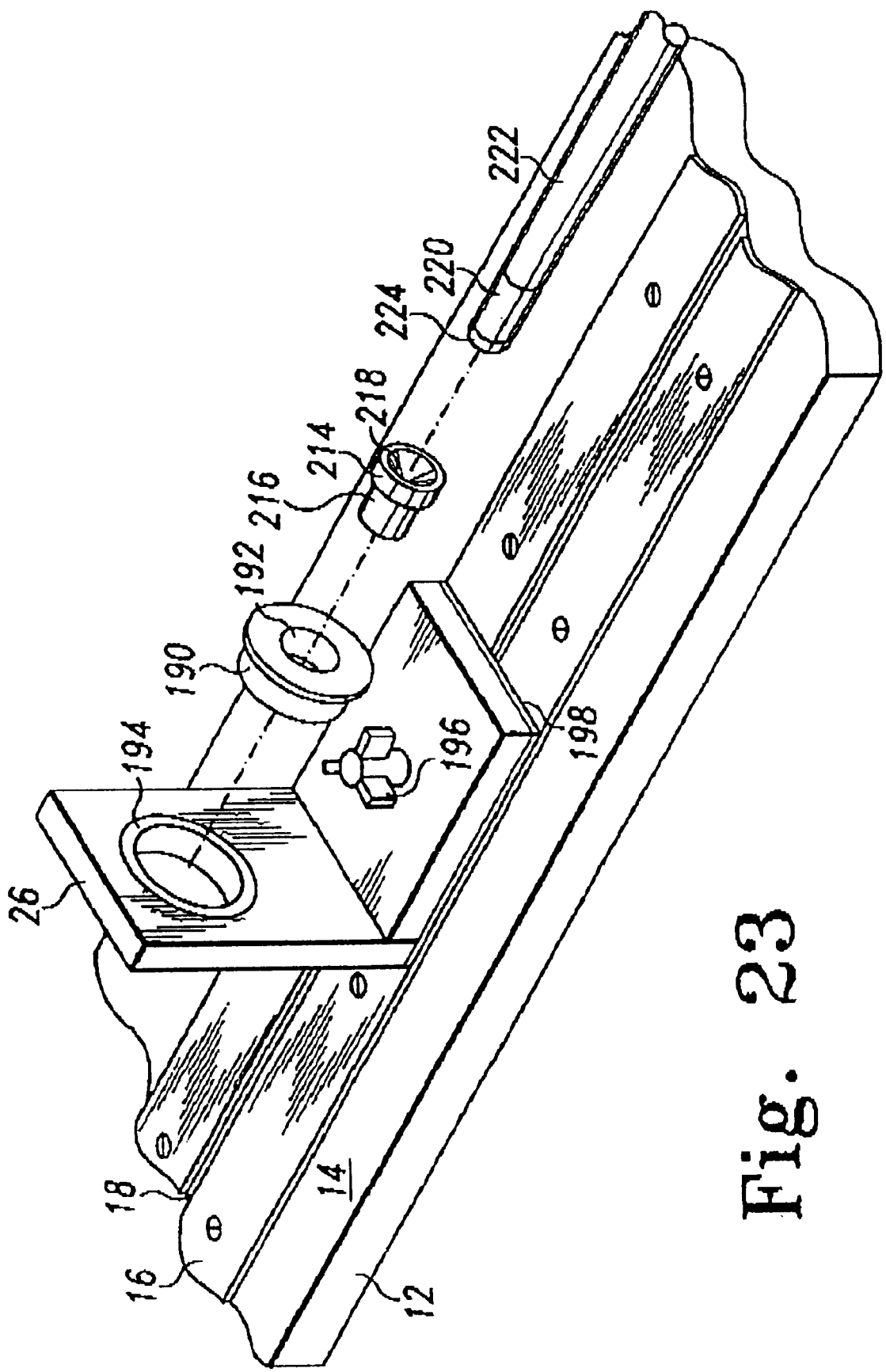
FIG. 23 is a partial, enlarged, exploded perspective view depicting the support, sleeve and shaft segment gripper of a cue servicing and repair apparatus representing the present invention.

As shown in FIGS. 22–23, sleeve 190, defining sleeve aperture 192, is removably mounted to support 26 within sleeve bearing 194 for rotation with sleeve bearing 194 about an axis generally parallel to slot 18. Support 26 is slidably mounted to guide way 16 using support fastener 196, and support pad 198 can be mounted to support 26 for sliding contact with guide way 16. By forming support pad 198 and the at least one support finger of resilient, low friction materials such as plastics, frictional contact and wear between support 26 and guide way 16 can be lessened. Cue 100, disposed through and held by the collet, can also be disposed through sleeve 190. By forming sleeve 190 of a flexible, resilient material, cue 100 can thereby be rotationally mounted with respect to support 26 by frictional contact through sleeve 190, without sleeve 190 causing damage to cue 100. With the motor rotationally driving the collet, cue 100 can rotate within support 26 and the headstock.

In the event that the present invention is used to repair or service a two-piece cue, a flexible, resilient gripper, adapted for mounting to sleeve 190 can be utilized, so that an end of a segment of a two-piece cue can be engaged with the gripper and mounted to the present invention without damaging the cue segment. More specifically, as shown in FIG. 22, a gripper can be in the form of butt segment gripper 200 having cylindrical portion 202, conical portion 204, and centering projection 206, adapted to engage larger end 208 of butt segment 210 of a two-piece cue. Cylindrical portion 202 is adapted to fit tightly within sleeve aperture 192, in order to mount butt segment gripper 200 to sleeve 190. Conical portion 204 is adapted to project into indentation, not shown, defined in larger end 208 of butt segment 210, with centering projection 206 acting to help align the axis defined by butt segment 210 with the rotational axis of sleeve bearing 194. Butt segment 210 can be rotationally mounted to the present invention, disposed through the collet and in contact with butt segment gripper 200.

Additionally, as shown in FIG. 23, a gripper can be in the form of shaft segment gripper 214 having neck portion 216 and indented portion 218, adapted to engage greater end 220 of shaft segment 222 of a two-piece cue. With neck portion 216 fitting tightly within sleeve aperture 192, indented portion 218 is adapted to receive threaded portion 224 of greater end 220 of shaft segment 222 and align an axis defined by shaft segment 222 with the rotational axis of sleeve bearing 194. Shaft segment 220 of a two-piece cue can be mounted to the present invention, disposed through the collet and in contact with shaft segment gripper 214. Additionally, shaft segment gripper 214 can have an indentation large enough in diameter to grip the butt end 230 of a cue.

Figure 35:
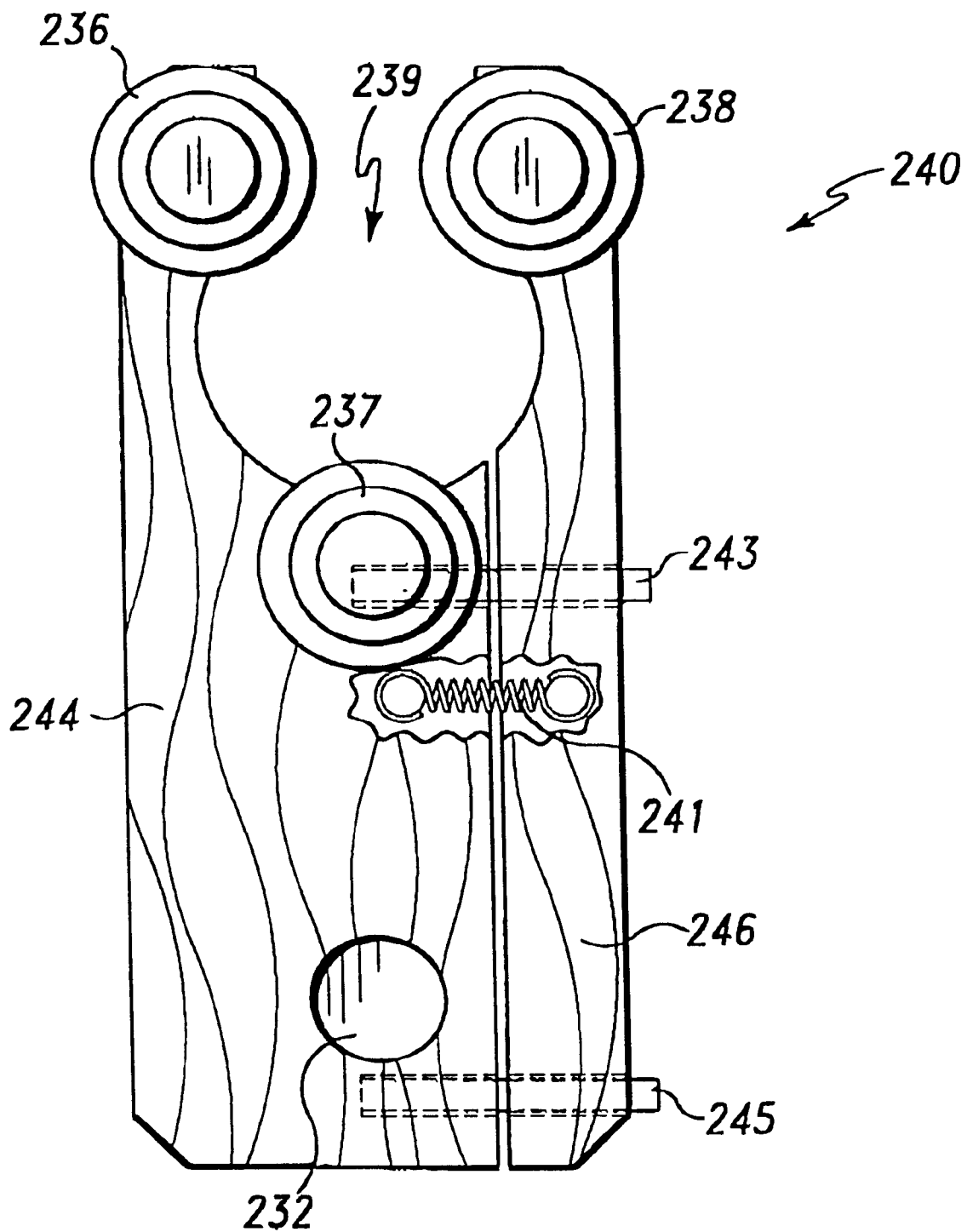
FIG. 35 is an elevation view of a damper apparatus representing the present invention.

In the event that the present invention is utilized to service or repair a one-piece cue, mounting of such a cue to the present invention with cue disposed through collet 50 and sleeve aperture 192 necessitates extension of butt end 230 beyond bed 12 as illustrated in FIGS. 1 and 4. Since one-piece cues are occasionally warped, rotation of a such a cue held in place by collet 50 and sleeve aperture 192 may produce significant circular movement of butt end 230. In order to damp such movement of butt end 230, damper 29 can be utilized. Damper 29, shown in detail in FIG. 35, includes a damper end 240 comprising generally first and second damper body portions 244 and 246 which are hingedly connected together by a flexible member 245. The first damper body portion 244 includes an opening 232 into which damper shaft 234 is fixed, for example, by a suitable adhesive. A pair of wheels 236 and 237 are fixed to the first damper body portion 244 while a third wheel 238 is fixed to the second damper body portion 246. The three wheels 236, 237 and 237 define an opening 239 for receiving the butt end 230 of a cue. The butt end 230 is introduced into the space 239 by inserting the cue between the outer portions of wheels 236 and 238 which causes the damper body portions 244 and 246 to hingedly separate. As the cue passes into the space 239, tension spring 241 biases the damper body portions 244 and 246 toward each other causing all three wheels 236, 237 and 237 to contact the surface of the cue. The damper body portions 244 and 246 are guided in their movement relative to each other and any inserted cue by guide member 243. Damper end 240, mounted to damper shaft 234, is slidably disposed through arm 238 to be attached to bed 12. Using damper 29, as a cue rotates within damper opening 239, any motion of butt end 230 is damped while the finish of cue is protected from damage by wheels 236, 237 and 237.

Figure 24:
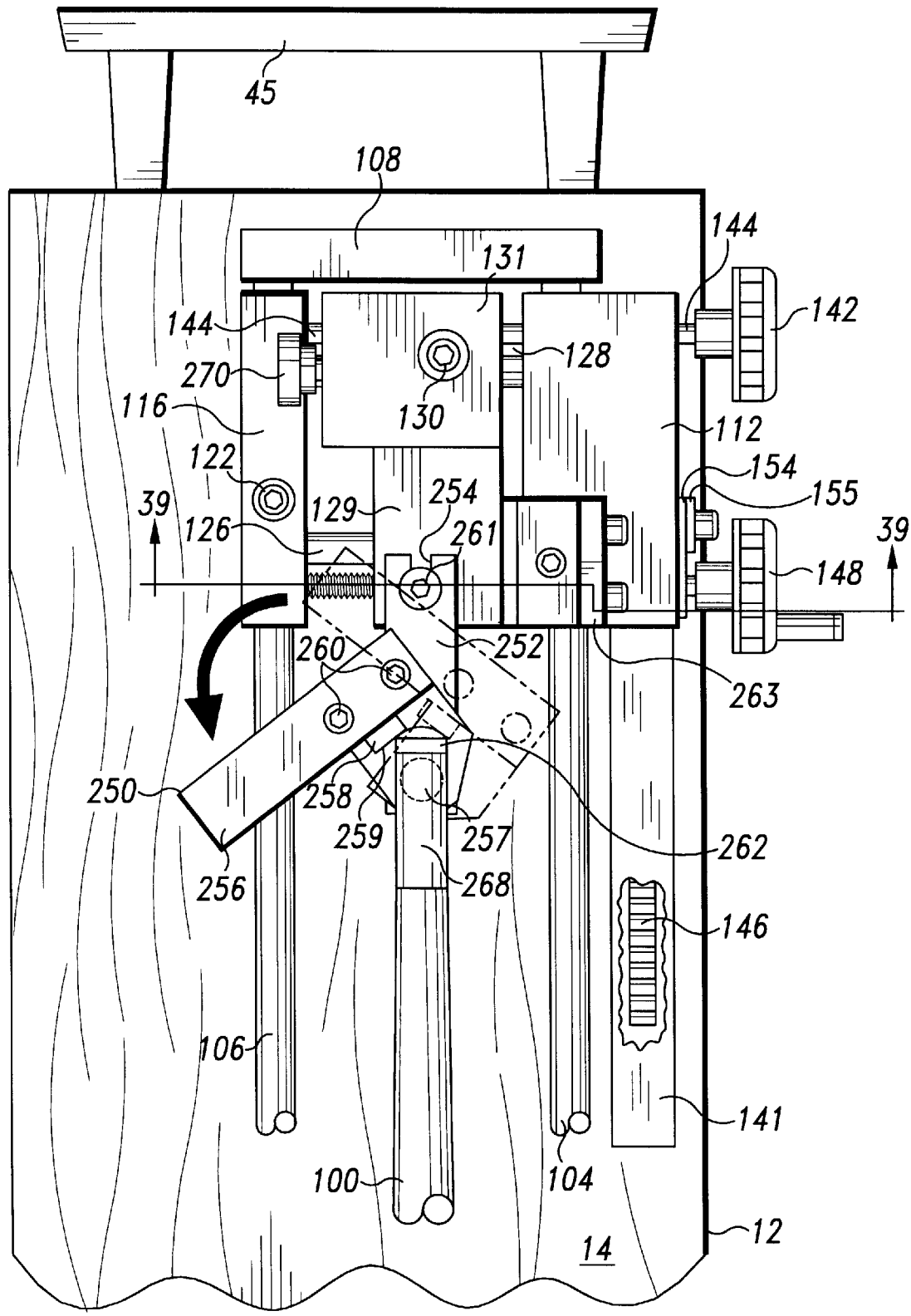
FIG. 24 is a partial, enlarged plan view of a cue servicing and repair apparatus representing the present invention with a cue mounted thereto, depicted with the cue tip shaper, illustrating in phantom a rotated position of the cue tip shaper, and showing a combined rack guard and break partially broken away to view the hidden rack.

With reference to FIG. 24, cue tip shaper 250 is provided and includes shaper base 252 defining shaper attachment slot 254 and shaper arm 256 rotatably mounted to shaper base 252 at shaper pivot 257. Shaper blade 258, defining tip cutting surface 259 is adjustably mounted to shaper arm 256 using blade fasteners 260. Cue tip shaper 250 is removably mountable to tailstock 131 by tailstock fastener 261 disposed through shaper attachment slot 254, so that shaper arm 256 is rotatable at shaper pivot 257 about an axis that is generally normal to planar surface 14 and to first and second longitudinal rails 104 and 106. With the motor driving the rotation member thereby causing cue 100 mounted through the collet to rotate, a cue tip 262 attached to cue 100 can be shaped to a preselected curvature, by positioning tailstock 131 and cue tip shaper 250 using longitudinal feed knob 142 and transverse feed knob 148, and rotating shaper arm 256 about shaper pivot 257 so that cue tip shaper 250 is proximate to rotating cue 100 and tip cutting surface 259 contacts and shapes rotating cue tip 262. Cue tip 262 can thus be shaped to have a wide variety of profiles by manipulation of longitudinal feed knob 142 and transverse feed knob 148 while rotating shaper arm 256.

In addition, as shown in FIGS. 8 and 9, the present invention provides cue cutter 263, having cue cutting element 264 removably mountable to first axial block 112 using cutter attachment plate 265 and attachment plate fastener 266. With motor 31 driving rotation member 24, causing cue 100 mounted through collet 50 to rotate, cue end 267 and ferrule 268, from which a cue tip has been removed, can be cut and trimmed to remove material prior to attaching a replacement cue tip, by positioning first axial block 112 and cue cutter 263 parallel to planar surface 14 using longitudinal feed knob 142 so that cue cutter 263 is proximate to rotating cue end 267 and ferrule 268, with cue cutting element 264 contacting, cutting and trimming material at cue end 267 and ferrule 268 of rotating cue 100.

Figure 25:
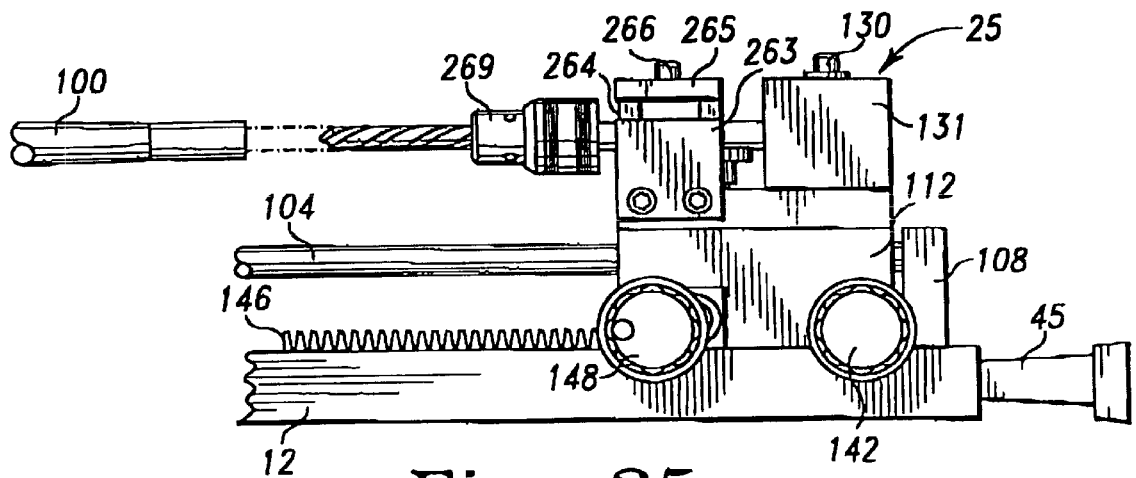
FIG. 25 is a partial, enlarged elevational view of a cue servicing and repair apparatus representing the present invention, illustrating the drill member mounted to the tailstock.

Depicted in FIG. 25, drill member 269 is adapted to be mounted to tailstock 131 by insertion into tailstock bore 132 and securing with tailstock fastener 270. Using longitudinal feed knob 142 and transverse feed knob 148 to coaxially align drill member 269 with cue 100 mounted to the present invention, movement of drill member 269 towards rotating cue 100 using cutter feed 25 enables a coaxial hole to be drilled into cue 100, thereby permitting insertion of a dowel or similar as part of replacement of a damaged portion of cue 100.

Figure 26:
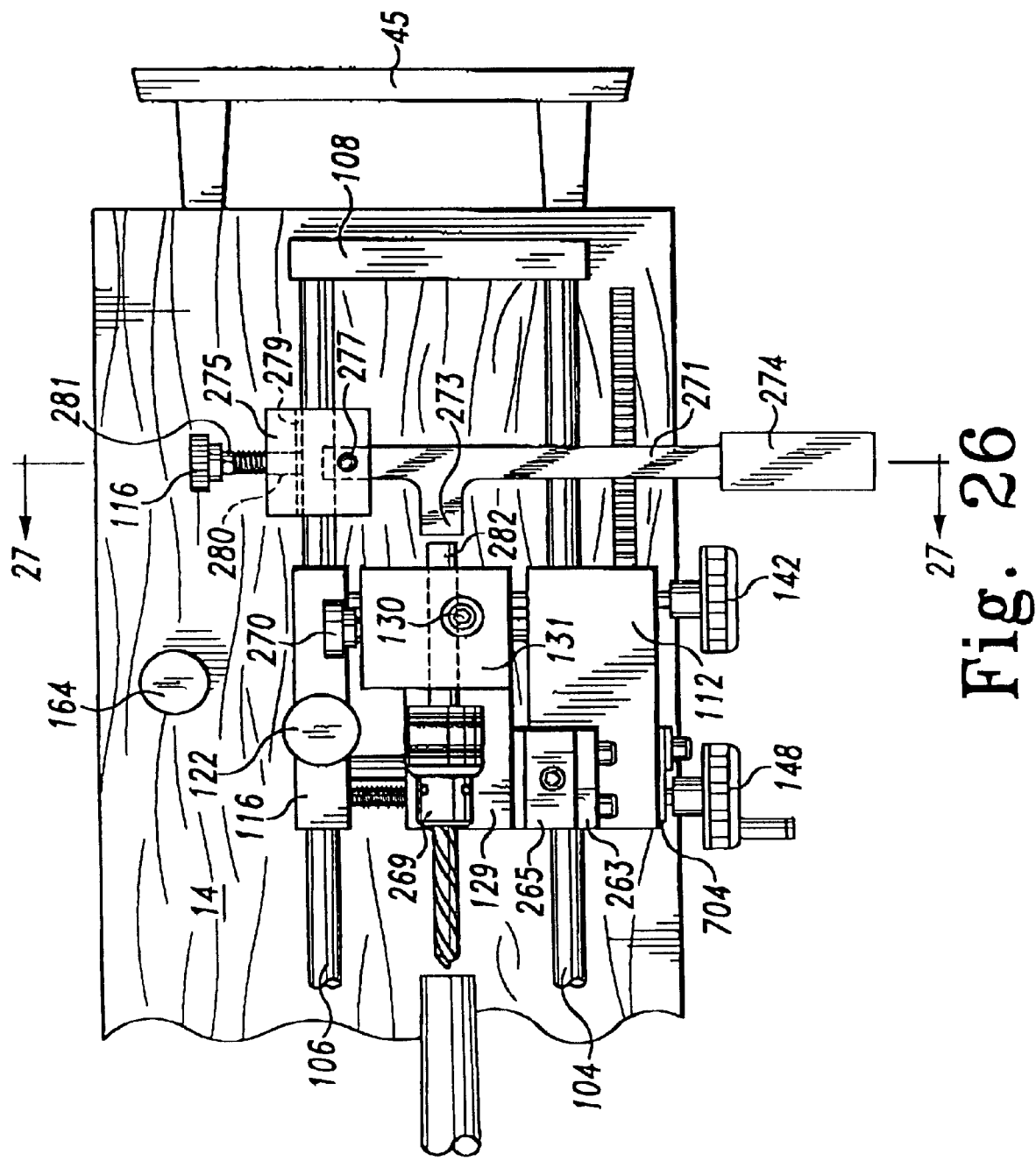
FIG. 26 is a partial, enlarged plan view of a cue servicing and repair apparatus representing the present invention, depicted with the lever mounted to the second longitudinal rail.
Figure 27:
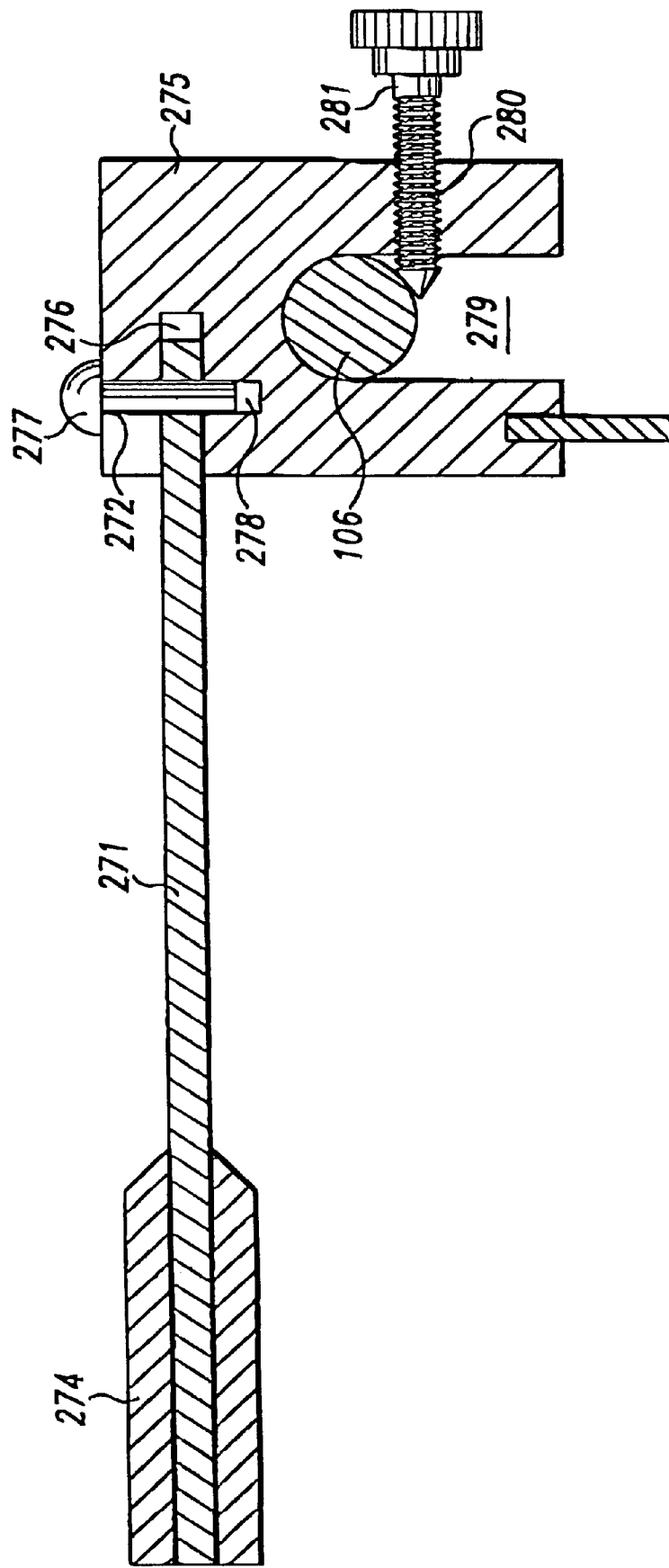
FIG. 27 is an enlarged sectional view of a portion of a cue servicing and repair apparatus representing the present invention, taken along line 27—27 of FIG. 26.

In addition, as shown in FIGS. 26 and 27, movement of cutter feed 25 and tailstock 131 towards cue 100 can be facilitated by use of lever 271 defining lever pin hole 272 and having contact portion 273 and lever handle 274. Lever 271 is pivotally mounted to lever bracket 275 within lever slot 276 by attachment with lever pin 277 disposed in lever pin aperture 278. Lever bracket 275 further defines generally U-shaped rail slot 279 and tapped lever bracket bore 280, whereby lever bracket 275 can be disposed with second longitudinal rail 106 cradled within rail slot 279 and threaded lever bracket fastener 281 disposed within lever bracket bore 280 and bearing against second longitudinal rail 106. In this way, lever bracket 275 and lever 271 can be removably mounted to second longitudinal rail 106 at a desired position so that contact portion 273 is capable of bearing against a portion of cutter feed 25, tailstock 131, or, as illustrated in FIG. 26, arbor 282. In use, pivoting movement of lever 271 using lever handle 274 causes contact portion 273 to bear against cutter feed 25, tailstock 131, or arbor 282, forcing cutter feed 25 and drill member 269 to move parallel to bed 12 and guide way 16 toward rotating cue 100. Using lever 271 in this manner, significant force can be applied to drill member 269 towards cue 100, so that a hole can be readily drilled into cue 100.

Figure 40:
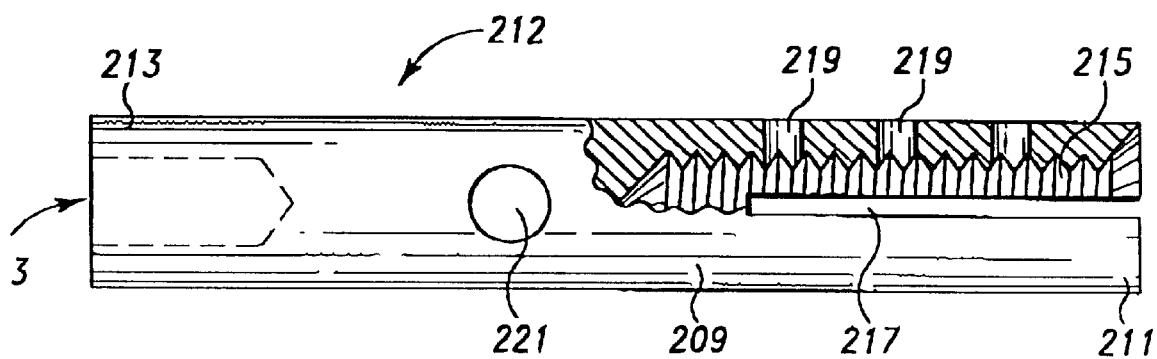
FIG. 40 is a side elevation view of a compression die which can be mounted to the tailstock partially broken away to show chip holes.

Once a hole is drilled into cue 100, a dowel pin, not shown, can be inserted and cemented in place. The dowel pin can by pre-threaded or can be threaded following its insertion into cue 100 using a compression die 212 as shown in FIG. 40. The compression die 212 comprises a body 209 having first end 211 and second end 213. The first end 211 includes a tap thread interior surface 215 for forming a thread onto the dowel pin exterior surface. A relief slot 217 extends along substantially the entire length of the tap thread while a plurality of chip holes 219 are provided to permit chaff to exit from between the dowel surface and the interior surface 215. A cross hole 221 is provided to receiver a driver, not shown, to facilitate rotation of the compression die 212 during the tapping process. A sizing hole 223, shown in phantom, can be provided in the second end 213 preferably having an inner diameter of a size appropriate to gage the dowel with which the compression die 212 is to be employed. The sizing hole 223 can also be used to receive a supporting pin, not shown, held in tailstock bore 132 by fastener 270 to support and align the compression die 212 with the dowel fixed in cue 100 during the threading process.

Figure 28:
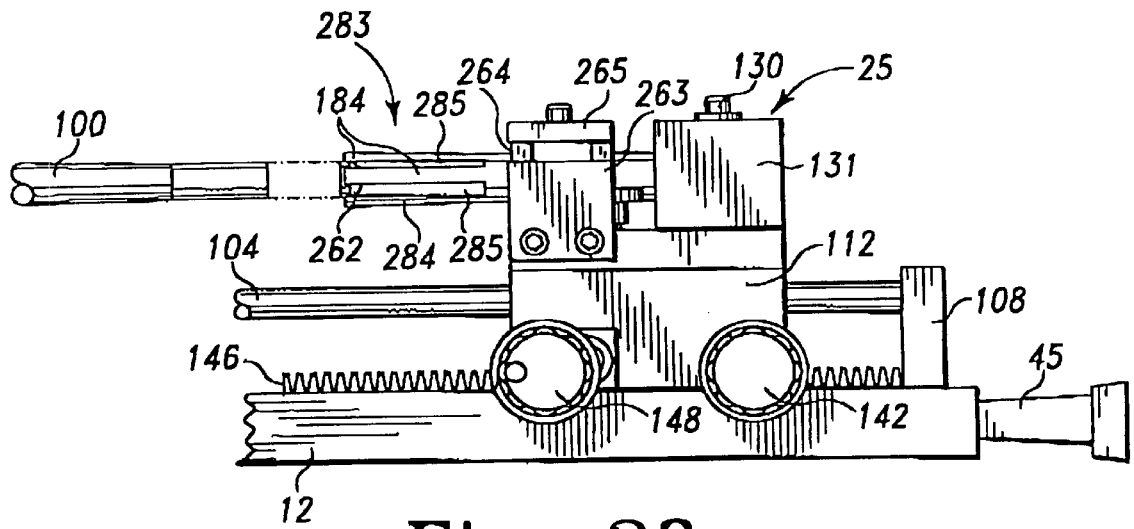
FIG. 28 is a partial, enlarged elevational view of a cue servicing and repair apparatus representing the present invention, illustrating the cue tip holder mounted to the tailstock.
Figure 29:
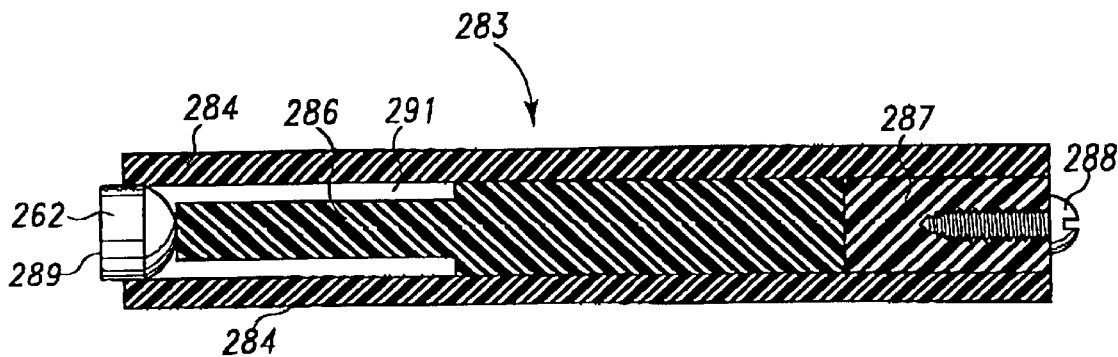
FIG. 29 is a longitudinal sectional view of the cue tip holder of the present invention, depicted with a cue tip mounted thereto.

Illustrated in FIGS. 28–29 is cue tip holder 283 adapted to be mounted to tailstock 131 by insertion into tailstock bore 132 and securing with tailstock fastener 270. Cue tip holder 283 includes at least a pair of opposing flexible, resilient fingers 284 separated by finger slots 285 and adapted to grip cue tip 262 therebetween and against interior stop 286 mounted with interior block 287 and block fastener 288, prior to attachment of cue tip 262 to cue 100. Cue tip 262, held by cue tip holder 283 by flexure of fingers 284 with planar side 289 projecting outwardly, can be disposed at a preselected position with respect to cue 100 mounted to the present invention by adjusting tailstock 131 using longitudinal feed knob 142 and transverse feed knob 148. With motor 31 not operating and cue 100 stationary, by depositing a suitable adhesive on planar side 289, cue tip 262 can be positioned as desired proximate to cue 100, using cutter feed 25 to move cue tip holder 283 so that cue tip 262 comes into contact with cue 100, thereby mounting cue tip 262 to cue 100. The gap 291 between the interior stop 286 and fingers 284 allows the fingers to flexibly move independently of the stop 286.

Figure 30:
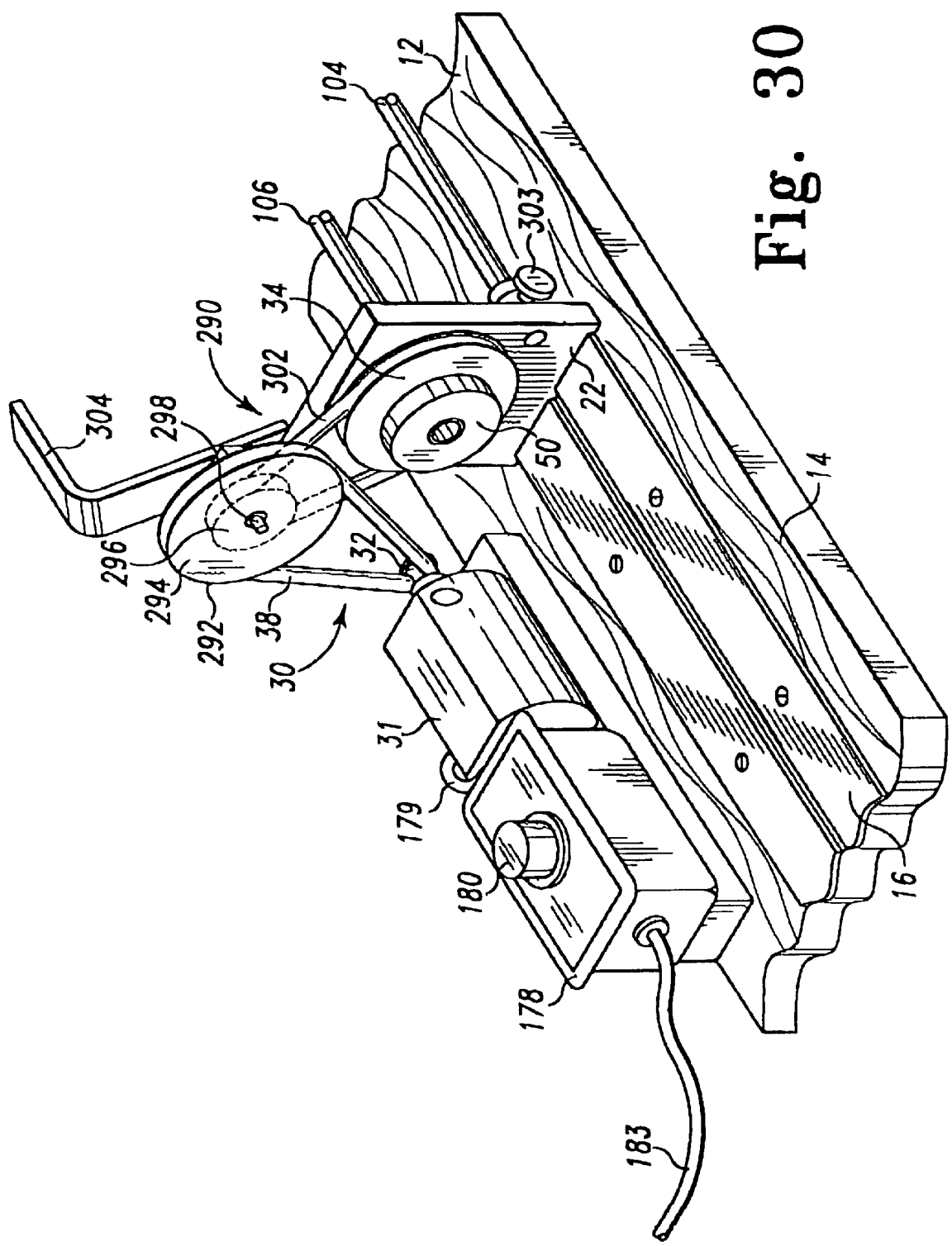
FIG. 30 is a partial, enlarged perspective view of a cue servicing and repair apparatus representing the present invention depicting the speed reduction assembly, with the smaller pulley shown in phantom.
Figure 31:
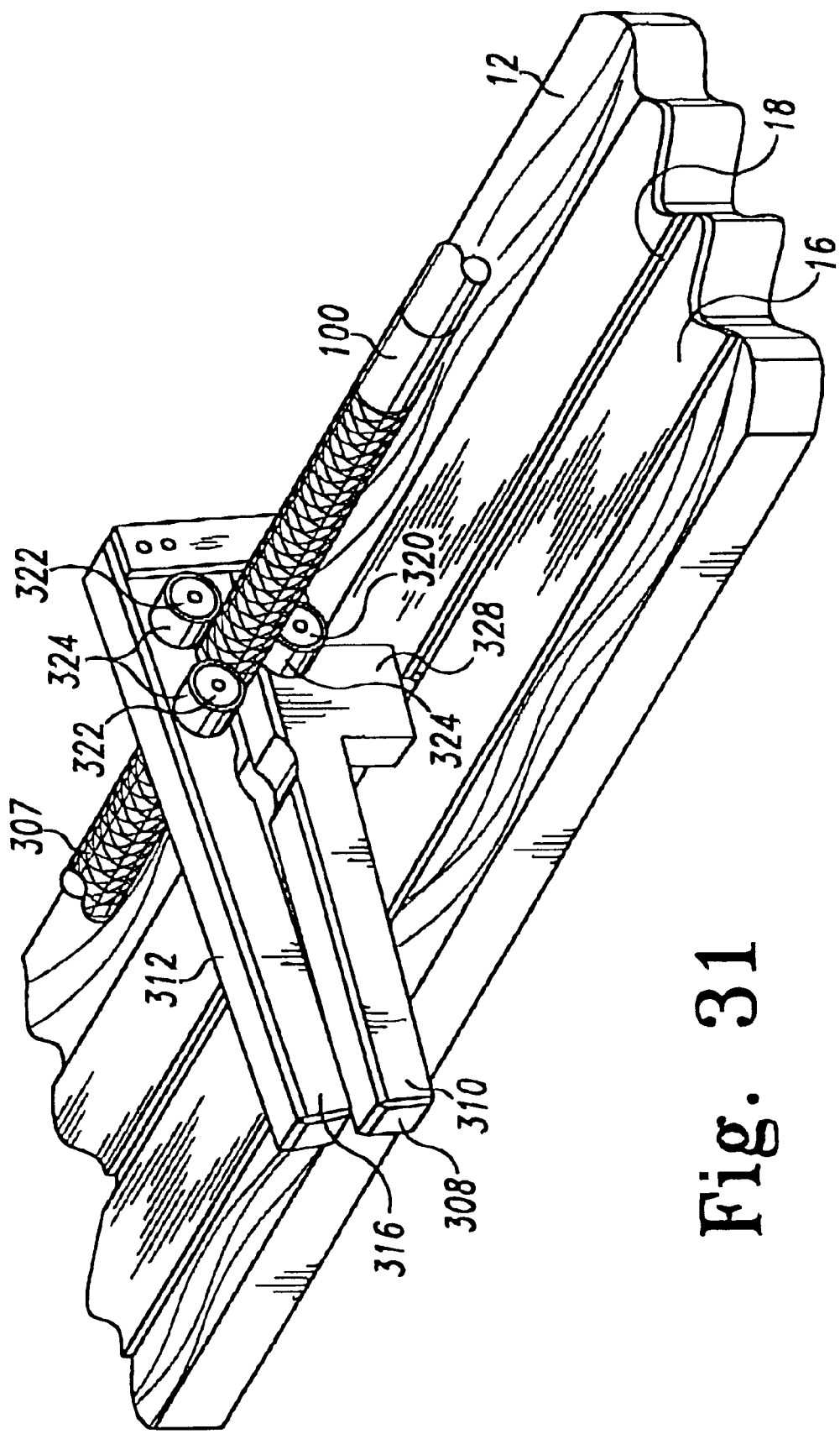
FIG. 31 is a partial, enlarged perspective view of a cue servicing and repair apparatus representing the present invention, illustrated with the pincers press and depicted with a cue held between the pincers arms.

As shown in FIG. 30, coupler 30 can include speed reduction assembly 290 for decreasing rotational speed of rotation member 24 resulting from a given rotational speed of motor 31, as desirable for those operations of the present invention more appropriately performed at low rotational speed. Speed reduction assembly 290 includes speed reduction pulley 292 having larger pulley portion 294 and smaller pulley portion 296, rotatably mounted to reduction shaft 298 attached to projecting arm 23 and disposed generally parallel to guide way 16. When the present invention is used with speed reduction assembly 290, belt 38 is mounted between motor pulley 32 and larger pulley portion 294, and second belt 302 is mounted between smaller pulley portion 296 and collet pulley 34. The speed reduction pulley 292 is held in position only by the belt load of the two belts 38 and 302, and is therefore easily removed without the use of tools. In this mode, motor 31 is slightly displaced parallel to guide way 16 by moving motor support base 158 with respect to pivot pin 160 and first or second retainer pin 162 or 164, in order to align motor pulley 32 with larger pulley portion 294, and to align smaller pulley portion 296 with collet pulley 34. In addition, by appropriately choosing the dimensions of larger pulley portion 294 and smaller pulley portion 296, and the location of reduction shaft 298, second belt 302 can be selected to be interchangeable with belt 38.

During repair and servicing operations utilizing cue tip shaper 250, cue cutter 263, drill member 269 or cue tip holder 283, slidable stop 303 can be positioned to a selected location along first longitudinal rail 104, in order to facilitate movement of cutter feed 25 to a desired position. Further, rest bracket 304 can be positioned as desired with respect to projecting arm 23 by securing with rest bracket fastener 305. In addition, mounting of a cue through collet 50 and removal therefrom can be accomplished by manually tightening collet body 53 with respect to collet adjuster 62, or alternatively can be facilitated by using appropriate lever tools, not shown, within pry holes 59 and adjuster pry holes 64.

Referring now to FIGS. 31–34, the present invention also includes pincers press 306, provided to smooth wrap 307 that can be applied to butt end 230 of cue 100 by winding a fine cord material therearound. Pincers press 306 includes first pincers arm 308 defining first lateral surface 310, and second pincers arm 312 pivotally attached to first pincers arm 308 at pincers pivot 314 and defining second lateral surface 316 proximate to first lateral surface 310. First pressing member 320 is mounted to first pincers arm 308 to project from first lateral surface 310 and towards second pincers arm 312. A pair of second pressing members 322 are mounted to second pincers arm 312, projecting from second lateral surface 316 and towards first pincers arm 308. Each pressing member 320, 322 includes rotatable cylinder 324. Pincers guide member 328, adapted for slidable coupling to guide way 16 at slot 18, is mounted to pincers press 306 at first pincers arm 308. Pincers press 306 can be slidably moved along guide way 16 with pincers guide member coupled to guide way 16, and simultaneously pinch butt end 230 between first pressing member 320 and second pressing members 322 by pivoting second pincers arm 312 towards first pincers arm 308. Rotation of butt end 230 is accompanied by rotation of rotatable cylinders 324 due to frictional contact with butt end 230, resulting from pressure applied by first and second pressing members 320 and 322. In this way, wrap 307 can be smoothed along the length of butt end 230. It will of course be recognized that the number and relative location of pressing members 320, 322 mounted to first and second arms 308 and 312 can vary, provided that at least one pressing member 320, 322 is mounted to each of first and second arms 308 and 312, so that pinching pressure can be applied to butt end 230.

Figure 36:
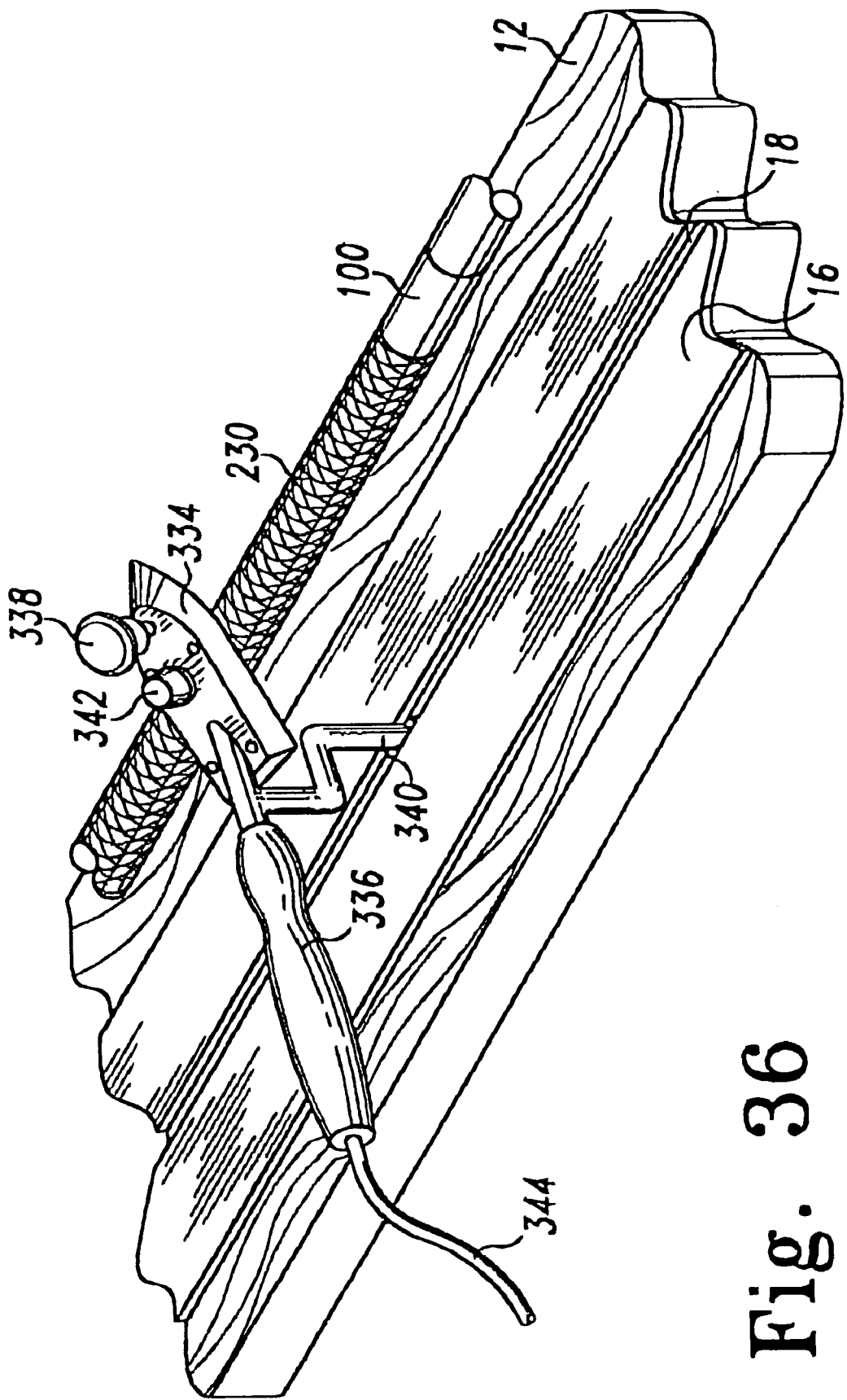
FIG. 36 is a partial, enlarged perspective view of a cue servicing and repair apparatus representing the present invention, illustrated with the smoothing iron.
Figure 37:
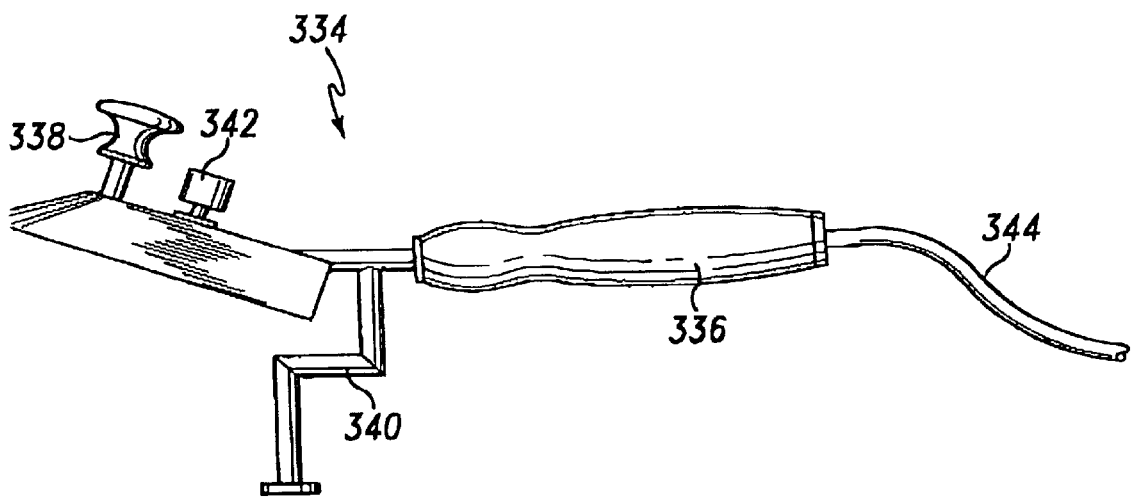
FIG. 37 is an enlarged side view of the smoothing iron of the cue servicing and repair apparatus representing the present invention.
Figure 38:
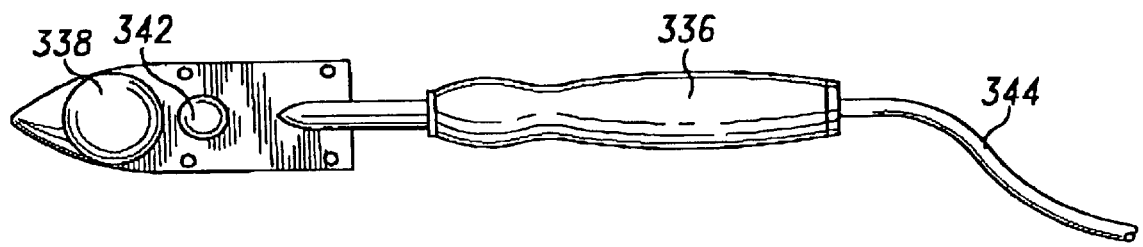
FIG. 38 is an enlarged top view of the smoothing iron of the cue servicing and repair apparatus representing the present invention.

As depicted in FIGS. 36–38, the present invention further includes electrically powered smoothing iron 334 for smoothing wrap 307. Smoothing iron 334 includes iron handle 336 and separately disposed steering knob 338, and is mounted to iron guide member 340 for slidable coupling to guide way 16 at slot 18. Temperature control 342 is used to vary the temperature of smoothing iron 334 through electrical power supplied by iron power cord 344. As butt end 230 of cue 100 rotates, smoothing iron 334 can be slidably moved along guide way 16 and apply heat and pressure to butt end 230 mounted to the present invention, thereby smoothing wrap 307.

The present invention having been described in its preferred embodiments, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. An apparatus for servicing a cue, of the type having a bed defining a generally horizontal planar surface and including a longitudinal guide way, a headstock mounted to the bed and including a rotation member, a support slidably mounted to the guide way and alignable with the headstock, a motor, and a coupler for coupling the motor to the rotation member, wherein the improvement comprises:

a collet mounted to the rotation member, including
a collet body defining a passage therethrough including a generally conical surface having a larger diameter end and a smaller diameter end;
at least two collet jaws, each collet jaw formed of a flexible, resilient material, slidably disposed within passage proximate to the conical surface and having a generally cylindrical inner surface and a generally conical collet jaw outer surface corresponding to at least a portion of the conical surface proximate to the larger end, so that as each collet jaw slides towards the smaller diameter end, an arcuate gap is defined between each collet jaw outer surface and a portion of the conical surface; and
an adjuster mounted to the collet body for slidably moving the collet jaws towards the smaller diameter end, whereby the collet jaw inner surfaces are capable of bearing against a portion of a cue inserted through the passage and the collet jaws so that the gaps are reduced in size by flexure of the collet jaws towards the conical surface, thereby distributing as well as lowering any force acting on the cue by the collet jaws so that the possibility of damage to the cue is reduced.

2. An apparatus for servicing a cue as recited in claim 1, further comprising:

at least one biasing element coupled to the collet jaws for urging each of the collet jaws generally radially outwardly against the passage and away from other of the collet jaws.

3. An apparatus for servicing a cue as recited in claim 2, wherein the at least one biasing element includes a spring disposed in a lateral gap defined between adjacent collet jaws.

4. An apparatus for servicing a cue as recited in claim 1, wherein the collet jaws are formed of a plastic material.

5. An apparatus for servicing a cue, of the type having a bed defining a generally horizontal planar surface and including a longitudinal guide way, a headstock mounted to the bed and including a rotation member, a support slidably mounted to the guide way and alignable with the headstock, a motor, and a coupler for coupling the motor to the rotation member, a cutter feed, and means for mounting the cutter feed to the bed proximate to the headstock for movement parallel to the planar surface, the improvement comprising:

a first and a second longitudinal rail mounted to the bed and disposed generally parallel to the planar surface and the guide way;
a first axial block defining therethrough a first aperture corresponding to and slightly larger than the first axial rail, mounted for precise sliding movement surrounding and along the first longitudinal rail;
a second axial block having an axial block surface defining a second aperture corresponding to and substantially larger than the second longitudinal rail, mounted for sliding movement surrounding and along the second longitudinal rail; and
a first adjustment member mounted to the second axial block for holding the second longitudinal rail against a portion of the axial block surface at a preselected pressure to minimize any rotational play around the axis of the first longitudinal rail.

6. An apparatus for servicing a cue as recited in claim 5, further comprising a gear rack fixed to said bed, a longitudinal feed shaft disposed between said first and second axial blocks and having a gear engaged with a gear rack, and a knob coupled to the feed shaft for adjustably moving the cutter feed parallel to the guide way to a desired position.

7. An apparatus for servicing a cue as recited in claim 6, further comprising a gear rack cover having a lower surface in sliding contact with the bed including a longitudinal slot receiving the gear rack, the gear rack cover being engaged by one of said axial blocks so that any longitudinal movement of cutter feed also causes a corresponding movement of gear rack cover, the frictional force between the gear rack cover and the bed being adjustable by application of a downward force of the top of the gear rack cover so that the gear rack cover can be employed as a break to prevent undesirable longitudinal movement of cutter feed.

8. An apparatus for servicing a cue as recited in claim 5, further comprising a cue tip shaper having a base mounted to the cutter feed and an arm rotatably mounted to the base and including a tip cutting surface, whereby a cue tip attached to a cue mounted to the apparatus can be shaped to a preselected curvature by rotating the arm so that the tip cutting surface contacts the cue tip.

9. An apparatus for servicing a cue as recited in claim 5, wherein the means for mounting the cutter feed to the bed includes:

a first and a second transverse rail disposed generally parallel to the planar surface and perpendicular to the guide way, attaching the first axial block to the second axial block;

a transverse block defining therethrough a first opening corresponding to and slightly larger than the first transverse rail and having a transverse block surface defining a second opening corresponding to and substantially larger than the second transverse rail, mounted for sliding movement along the first and second transverse rails with the first transverse rail disposed within the first opening and the second transverse rail disposed within the second opening; and a second adjustment member mounted to the transverse block for holding the second transverse rail against a portion of the transverse block surface at a predetermined pressure to minimize any rotational play around the axis of the first transverse rail.

10. An apparatus for servicing a cue as recited in claim 9, further comprising a cue tip shaper having a base mounted to the transverse block and an arm rotatably mounted to the base and including a tip cutting surface, whereby a cue tip attached to a cue mounted to the apparatus can be shaped to a variety of curvatures by varying the transverse location of the transverse block and rotating the arm so that the tip cutting surface contacts the cue tip.

11. An apparatus for servicing a cue as recited in claim 9, wherein the means for mounting the cutter feed to the bed includes:

a tailstock fixed to the transverse block, the tailstock including a bore adapted to support a tool for working on a cue, and a lever having a contact portion, pivotally and removably mounted to the longitudinal rail with the contact portion proximate to the tailstock, whereby pivoting movement of the lever with the contact portion bearing against the tailstock moves the tool toward to a cue.

12. An apparatus for servicing a cue as recited in claim 11, wherein the tool supported by the tailstock bore comprises a member of the group consisting of: a drill chuck, a boring bar, a tip-centering tool, and a compression die.

13. An apparatus for servicing a cue as recited in claim 12, wherein the compression die comprises a body having first and second ends, the first end including a tap thread interior surface, the body including at least one relief slot extending along substantially the entire length of the tap thread while a plurality of chip holes are provided periodically along the tap thread to permit chaff to exit from between the tap thread interior surface and a workpiece inserted in the first end.

14. An apparatus for servicing a cue as recited in claim 5, wherein either of said first and second apertures further comprises:

at least one bearing channel communicating with the aperture; and a bearing rod mounted in each bearing channel so that a portion of the bearing rod projects within the aperture, whereby the axial block is mounted generally surrounding the longitudinal rail for sliding movement in contact with a portion of the bearing rod.

15. An apparatus for servicing a cue as recited in claim 14, further comprising an adjustment member mounted to the axial block for holding the axial rail against a portion of the bearing rod at a preselected pressure.

16. An apparatus for servicing a cue as recited in claim 14, wherein the bearing rod is removable from and replaceable in the bearing channel without removal of the longitudinal rail from the aperture.

17. An apparatus for servicing a cue, of the type having a bed defining a generally horizontal planar surface and including a longitudinal guide way, a headstock mounted to the bed and including a rotation member, a support slidably mounted to the guide way and alignable with the headstock, a motor, and a coupler for coupling the motor to the rotation member, wherein the improvement comprises a sleeve formed of a flexible, resilient material and mounted to the support for rotation about an axis generally parallel to the guide way, the sleeve having an inside diameter sized so that a cue can be disposed through and mounted by frictional contact in the sleeve without the sleeve damaging the cue.

18. An apparatus for servicing a cue as recited in claim 17, further comprising a flexible, resilient gripper adapted for mounting to the sleeve whereby an end of a cue can be engaged with the gripper and the cue mounted to the apparatus without the gripper damaging the cue.

19. An apparatus for servicing a cue as recited in claim 18, wherein the gripper is adapted to engage a larger end of a shaft segment of a two-piece cue.

20. An apparatus for servicing a cue as recited in claim 18, wherein the gripper is adapted to engage a larger end of a butt segment of a two-piece cue.

21. An apparatus for servicing a cue as recited in claim 1, further comprising:

an integral bearing having an inner race coupled to the collet body and an outer race having an exterior surface sized to be coupled to a bearing carrier held by a support so that the collet including the integral bearing can be easily removed from and replaced by another collet having a similar outer race.

22. An apparatus for servicing a cue as recited in claim 12 wherein the tip-centering tool comprises:

a cue tip holder adapted to be mounted to said cutter feed and having a main body, an interior stop post having a proximal end coupled to the main body, and at least a pair of opposing flexible, resilient fingers extending from the main body beyond a distal end of the interior stop post and separated from each other by slots for gripping a cue tip so that a cue tip held by the cue tip holder can be disposed at a preselected position with respect to a cue mounted to the apparatus, facilitating attachment of the cue tip to the cue.

23. An apparatus for servicing a cue as recited in claim 22, wherein the cue tip holder includes a center post and at least a pair of opposing resilient fingers surrounding and separate from the post adapted to hold a cue tip therebetween.

24. An apparatus for servicing a cue, of the type having a bed defining a generally horizontal planar surface and including a longitudinal guide way, a headstock mounted to the bed and including a rotation member, a support slidably mounted to the guide way and alignable with the headstock, a motor, and a coupler for coupling the motor to the rotation member, wherein the improvement comprises:

a base for mounting the motor to the bed, the base including at least two openings, a first retainer attached to the bed proximate to the support and a second retainer attached to the bed proximate to the headstock, whereby the motor base can be slidably detachably mounted to the first retainer and disposed in a first position proximate to the support, and can be slidably detachably mounted to the second retainer and disposed in a second position proximate to the headstock.

25. An apparatus for servicing a cue as recited in claim 24, further comprising a pivot pin situated between the first and second retainer, the first retainer including a first retainer pin, the second retainer including a second retainer pin, and the motor base including a pivot pin aperture adapted for pivoting coupling to the pivot pin and a retainer pin aperture adapted for coupling to the first retainer pin when the motor is disposed in the first position and to the second retainer pin when the motor is disposed in the second position.

26. An apparatus for servicing a cue as recited in claim 24, wherein the first and second retainer together form an integral strip mounted to the bed, and said at least two openings in said motor base comprise a pair of slots positioned on opposite sides of the base, each slot being sized to engage the integral strip at any point along the length of the strip.

27. An apparatus for servicing a cue as in claims 1, 5, 17, or 24, wherein the bed includes at least two bed segments and the guide way includes at least two guide way segments, and further comprising coupling means for coupling the at least two bed segments together so that the guide way segments are aligned with each other.

28. An apparatus for servicing a cue as in claims 1, 5, 17, or 24, wherein the bed includes at least two bed segments and the guide way includes at least two guide way segments, and further comprising at least one hinge disposed between and hingeably attaching the at least two adjacent bed segments.

29. An apparatus for servicing a cue as in claims 1, 5, 17, or 24, further comprising:

a damper mounted to the bed and disposed to project from the bed generally parallel to the guide way and opposing the headstock, the damper including a plurality of wheels biased toward at least one other wheel, the wheel defining a damper orifice having a diameter slightly smaller than a diameter of a larger end of a butt segment of a cue.

30. An apparatus for servicing a cue as in claims 1, 5, 17, or 24, wherein the coupler includes a speed reduction assembly for decreasing rotational speed of the rotation member resulting from a given rotational speed of the motor, the speed reduction assembly including an axle and a speed reduction pulley slidably retained on the axle by a belt coupling the speed reduction pulley to the motor.

31. An apparatus for servicing a cue as in claims 1, 5, 17, or 24, further comprising a controller for controlling a rotational speed of the motor, including a first speed control adapted to operated by hand connected in series with a second speed control adapted to be operated by foot, and a stop to hold the second speed control in a position that provides minimum electrical resistance so that the rotational speed of the motor can be controlled entirely by the first speed control.

* * * * *